United States Patent
Warren et al.

(10) Patent No.: US 12,407,725 B1
(45) Date of Patent: Sep. 2, 2025

(54) UNIFIED THREAT MANAGEMENT AND MITIGATION

(71) Applicant: MPC HOLDING, INC., Concord, NH (US)

(72) Inventors: Jason James Warren, Brunswick, ME (US); Miles Robert Parry, Croydon (GB)

(73) Assignee: MPC Holding, Inc., Concord, NH (US)

( * ) Notice: Subject to any disclaimer, the term of this patent is extended or adjusted under 35 U.S.C. 154(b) by 0 days.

(21) Appl. No.: 18/975,690

(22) Filed: Dec. 10, 2024

Related U.S. Application Data

(60) Provisional application No. 63/690,132, filed on Sep. 3, 2024.

(51) Int. Cl.
*H04L 9/40* (2022.01)

(52) U.S. Cl.
CPC ...... *H04L 63/1491* (2013.01); *H04L 63/0464* (2013.01); *H04L 63/1416* (2013.01)

(58) Field of Classification Search
CPC ............. H04L 63/1491; H04L 63/0464; H04L 63/1416
See application file for complete search history.

(56) References Cited

U.S. PATENT DOCUMENTS

| | | | |
|---|---|---|---|
| 8,549,643 B1 * | 10/2013 | Shou | G06F 21/556 455/410 |
| 10,080,249 B1 | 9/2018 | Delaney et al. | |
| 10,616,938 B1 | 4/2020 | Delaney et al. | |
| 10,972,587 B1 | 4/2021 | Delaney et al. | |
| 11,218,485 B1 | 1/2022 | Delaney et al. | |
| 11,224,080 B1 | 1/2022 | Delaney et al. | |
| 11,258,672 B1 * | 2/2022 | Delaney | H04L 12/4641 |
| 11,329,954 B1 | 5/2022 | Delaney et al. | |
| 11,349,646 B1 | 5/2022 | Delaney et al. | |
| 11,394,694 B1 | 7/2022 | Ademiluyi et al. | |
| 11,444,981 B1 | 9/2022 | Delaney et al. | |
| 11,539,821 B1 | 12/2022 | Delaney et al. | |
| 11,729,138 B1 | 8/2023 | Delaney et al. | |
| 11,778,039 B1 | 10/2023 | Delaney et al. | |
| 11,824,839 B1 | 11/2023 | Ademiluyi et al. | |
| 11,855,965 B1 | 12/2023 | Delaney et al. | |
| 11,888,822 B1 | 1/2024 | Delaney et al. | |

(Continued)

*Primary Examiner* — Henry Tsang
(74) *Attorney, Agent, or Firm* — Barnes & Thornburg LLP

(57) ABSTRACT

Disclosed are systems, methods, and techniques for transmitting encrypted data over a network. A system can include a group of nodes having secure communication to transmit encrypted data from a source to a final destination. The encrypted data can be transmitted in a packet that can include a previous hop in the network and a subsequent hop, where the packet excludes the final destination. A first node in the group can: receive the encrypted data from the source through a first secure connection, the encrypted data being wrapped, by the source, using the first secure connection, unwrap the data, determine whether routing parameters are met based on the unwrapped data, in response to determining that the routing parameters are met, identify a corresponding second secure communication, rewrap the data using the corresponding second secure connection, and transmit the rewrapped data to the subsequent hop using the corresponding second secure connection.

30 Claims, 11 Drawing Sheets

(56) References Cited

U.S. PATENT DOCUMENTS

| | | |
|---|---|---|
| 11,956,277 B1 | 4/2024 | Delaney et al. |
| 11,996,983 B1 | 5/2024 | Delaney et al. |
| 12,047,481 B1 | 7/2024 | Delaney et al. |
| 2017/0353491 A1* | 12/2017 | Gukal .................. G06F 21/552 |
| 2020/0304477 A1* | 9/2020 | Venkataraman .... H04L 12/4633 |

* cited by examiner

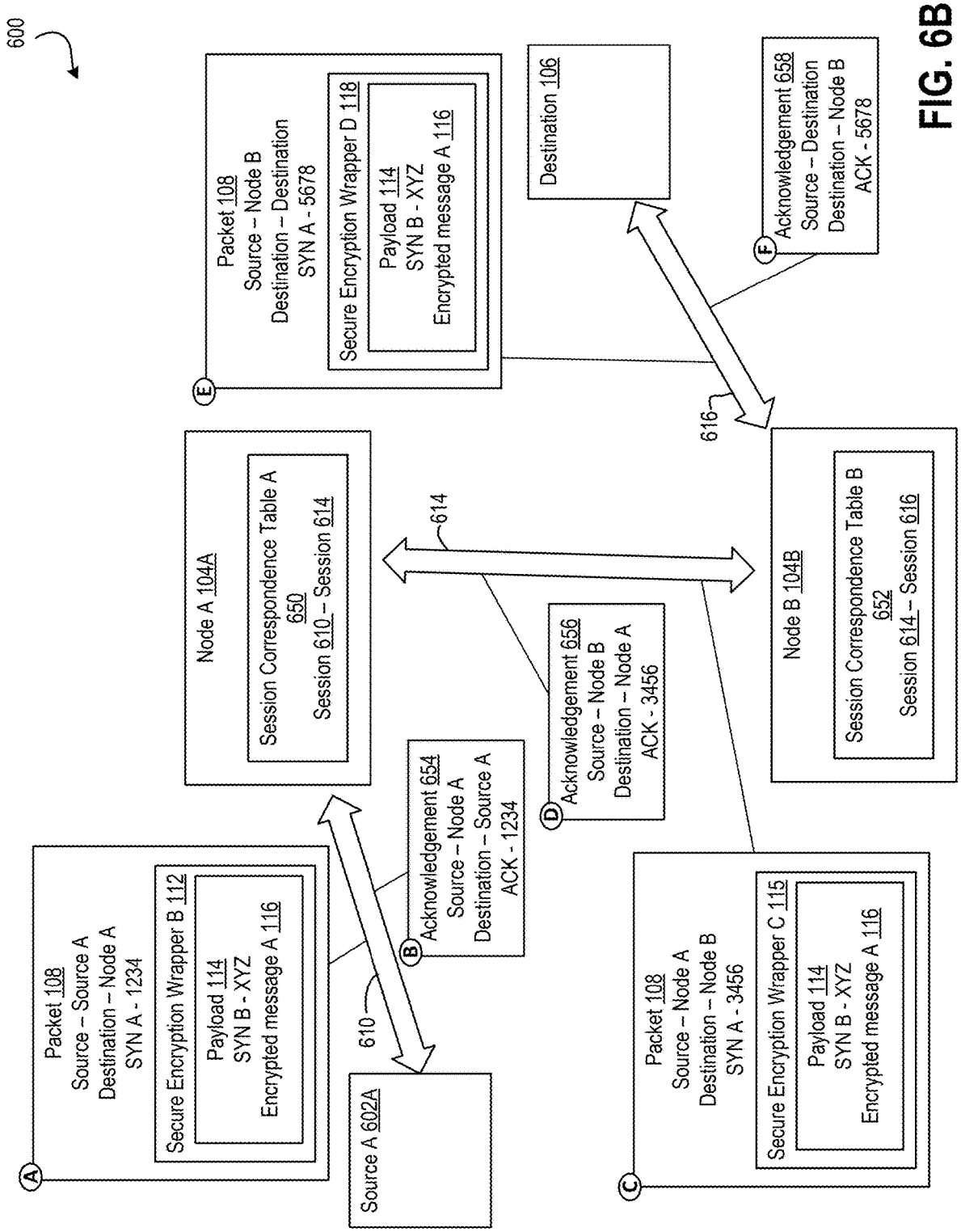

UNIFIED THREAT MANAGEMENT AND MITIGATION

INCORPORATION BY REFERENCE

This application claims the benefit of priority of U.S. Provisional Patent Application No. 63/690,132, filed Sep. 3, 2024, the entire contents of which are incorporated herein by reference.

TECHNICAL FIELD

This disclosure generally describes devices, systems, and methods related to obfuscating network traffic, and more specifically to preventing identification of traffic ingress to a network and obscuring the traffic's final destination.

BACKGROUND

Multi-hop topologies, such as the Onion Router (TOR) protocol, can be used to anonymize internet traffic and provide users with some degree of privacy and censorship. The TOR protocol, for example, can include layered encryption in which encrypted data is sent through a network of nodes, where each node decrypts a layer of encryption to reveal the next node in a transit circuit. The TOR protocol and other existing multi-hop topologies may include one or more privacy and security vulnerabilities.

For example, the protocol can have exit node vulnerabilities. The exit node decrypts the data and sends the decrypted data to a destination. If the connection between the exit node and the destination is not encrypted, then an operator of the exit node may be capable of viewing, modifying, or manipulating the data. A malicious actor may also operate the exit node and thereby manipulate the data passing through the node, thereby compromising the privacy and security of the system. As another example of privacy and security vulnerabilities, patterns in timing and size of data packets being passed using the TOR protocol can be analyzed by third parties, such as a malicious actor, to infer user behavior and activities. The malicious actor can perform traffic correlation attacks and other analysis to determine which users are communicating with whom so that the malicious actor can compromise those communications and/or the data being transmitted between users.

SUMMARY

The disclosure generally describes technology for ensuring that data remains securely encrypted as it passes through a transit network, including obfuscating hops between nodes along a network transmission path and also obfuscating a final destination for the network transmission. More particularly, the disclosed technology mitigates privacy and security vulnerabilities associated with the TOR protocol (and/or other multi-hop topologies and protocols) by providing a private system that can prevent malicious actors (e.g., adversaries) from blocking data (e.g., traffic) ingress to the network and sniffing or otherwise compromising the data upon exit from the system while still providing network transit obfuscation. Using enterprise networking systems and protocols can make the disclosed system appear innocuous and difficult to detect, effectively hiding data being passed through the network in plain sight amongst other standard Internet traffic. The disclosed technology can also be deployed across multiple jurisdictions to maintain privacy, thereby ensuring that a single service provider cannot determine an entire transit path. Furthermore, the disclosed technology is designed based on zero trust and zero knowledge principles, ensuring that the transit network cannot decrypt the data being passed through the network and that a single node compromise would not result in the entire transit network or traffic destination being compromised. With the zero trust principles, transit nodes may only route the data to a next destination so that data privacy is maintained, even if one or more of the transit nodes are compromised. Similarly, with the zero knowledge principles, the transit nodes will only know a previous and next destination, thereby preventing potential compromise of a single node from revealing the final destination. Therefore, the disclosed technology provides a technical solution to the technical problems stemming from privacy and security vulnerabilities inherent in the traditional TOR protocol or other similar multi-hop topologies.

The disclosed technology provides a combination of transit nodes, each having at least one ingress gateway, at least one egress gateway, and a honeypot or decoy server. This configuration can allow for encrypted communication between the ingress and egress gateways of N number of transit nodes in the network, where each hop only knows the next hop destination (e.g., an egress gateway of transit node A knows the next hop destination is an ingress gateway of a subsequent transit node) and the traffic flowing from the ingress gateway and out to the egress gateway can be obfuscated. The transit nodes can be designed for agnostic traffic transit and can be leveraged for a variety of applications, protocols, and use cases that require obfuscation of the final destination. The honeypot servers in the network can be used to camouflage sensitive communications and also to detect malicious intrusions. For example, the honeypot servers can perform unrelated tasks (e.g., open-source software distribution) to produce innocuous background traffic that camouflages the data (e.g., traffic) in transit and the sensitive network connections between source, transit nodes, and destination. The honeypot servers may also be used to provide advanced warning of attempts to breach the network or investigation into an endpoint by a potentially malicious actor.

One or more embodiments described herein can include a system for transmitting encrypted data over a network, the system including: a network node having an ingress gateway and an egress gateway, the ingress gateway being configured to: receive a packet over a first secure connection, evaluate the packet and its contents, based on the evaluation, identify a corresponding second secure connection with the egress gateway, and transmit the packet over the corresponding second secure connection to the egress gateway. The egress gateway can be configured to: receive the packet over the corresponding second secure connection, evaluate the packet and its contents, based on the evaluation, identify a corresponding third secure connection with an ingress gateway of a subsequent network node, and transmit the packet over the corresponding third secure connection to the ingress gateway of the subsequent network node.

In some implementations, the embodiments described herein can optionally include one or more of the following features. For example, the network node further can include a honeypot server that can be configured to generate decoy traffic and return the decoy traffic into the network to obfuscate the data that is transmitted through the network. Based on the evaluation, the ingress gateway can be further configured to (i) unwrap the packet and (ii) wrap the packet using the corresponding second secure connection. The packet received over the first secure connection can identify the ingress gateway of the network node as a destination, and wrapping the packet using the corresponding second secure connection can include re-designating the destination in the packet as the egress gateway of the network node. Based on the evaluation, the egress gateway can be further configured to (i) unwrap the packet and (ii) wrap the packet using the corresponding third secure connection.

In some implementations, the first secure connection, the corresponding second secure connection, and the corresponding third secure connection can be different from each other. The first secure connection, the corresponding second secure connection, and the corresponding third secure connection can each be respective VPN connections. The ingress gateway can be further configured to: generate decoy traffic and return the decoy traffic into the network to obfuscate the data that is transmitted through the network. The first secure connection, the corresponding second secure connection, and the corresponding third secure connection can be (i) different from each other and (ii) each established in association with a source of the packet.

Sometimes, the ingress gateway and the egress gateway can be handled by separate and distinct components. The ingress gateway can be further configured to perform a first layer of network address translation techniques (natting) and the egress gateway can be further configured to perform a second layer of natting. The ingress gateway can be further configured to perform a client authentication mechanism based on receiving the packet over the first secure connection. In some implementations, the client authentication mechanism can be performed to determine whether the packet is decoy server traffic or authorized network traffic. The egress gateway can be configured to: pad the packet, and transmit the padded packet over the corresponding third secure connection to the ingress gateway of the subsequent network node. The egress gateway can be configured to pad the packet based on randomized padding techniques. An amount of the padding can be determined based on session parameters. The egress gateway can be further configured to communicate the amount of padding to the ingress gateway of the subsequent network node using the corresponding third secure connection. In some implementations, the system can include a first group of network nodes in a first zone and a second group of network nodes in a second zone, and a load balancer that can be configured to route traffic amongst the first group of network nodes in the first zone and the second group of network nodes in the second zone.

One or more embodiments described herein can include a system for transmitting encrypted data over a network, the system including: a group of nodes in a network having secure communication and configured to transmit encrypted data from a source to a final destination, the encrypted data being transmitted in a packet that can include a previous hop in the network and a subsequent hop in the network, where the packet can include the final destination. The first node in the group of nodes can be configured to: receive the encrypted data from the source through a first secure connection, the encrypted data being wrapped, by the source, using the first secure connection, the wrapping causing an additional layer of encryption for the encrypted data, unwrap the wrapped and encrypted data, determine whether one more routing parameters are met based on the unwrapped data, the unwrapped data including the encrypted data, in response to determining that the one or more routing parameters are met, identify a corresponding second secure communication, rewrap the unwrapped data using the corresponding second secure connection, and transmit the rewrapped data to the subsequent hop in the network using the corresponding second secure connection.

The system can optionally include one or more of the abovementioned features and/or one or more of the following features. For example, the first node can include an ingress gateway and an egress gateway, the ingress gateway being configured to: receive the wrapped and encrypted data from the source through the first secure connection, unwrap the wrapped and encrypted data, determine whether the one or more routing parameters are met based on the unwrapped data, where the unwrapped data can include the encrypted data, in response to determining that the one or more routing parameters are met, identify the corresponding second secure connection, rewrap the unwrapped data using the corresponding second secure connection, the rewrapped data including the encrypted data, and transmit the rewrapped data to the egress gateway of the first node through the corresponding second secure connection.

In some implementations, the egress gateway can be configured to: receive the rewrapped data from the ingress gateway of the first node through the corresponding second source connection, unwrap the rewrapped data, determine whether the one or more routing parameters are met based on the unwrapped data, in response to determining that the one or more routing parameters are met, identify a corresponding third secure connection, rewrap the unwrapped data via the corresponding third secure connection, and transmit the rewrapped data to an ingress gateway of the subsequent hop using the corresponding third secure connection. Sometimes, the first secure connection and the corresponding second secure connection can each include a different VPN connection. The source can be configured to identify a secure encrypted session and encrypt the data using a private key that can be shared with only the final destination. In response to encrypting the data at the source, the source can be configured to transmit the encrypted data using the first secure connection to the first node.

The first node can include a honeypot server that can be configured to generate decoy traffic and return the decoy traffic into the network to obfuscate the wrapped and encrypted data that is transmitted through the network from the source to the final destination. The honeypot server can be further configured to listen for potential breaches of the first node and, in response to detecting a potential breach, performing an automated action. The automated action can include transmitting an alert identifying the potential breach to the source or responding to the potential breach. The first node can be part of an untrusted local jurisdiction. The subsequent hop in the network can include a second node in the group of nodes. The second node can be part of an untrusted neutral jurisdiction. The destination can include a server having secure storage servers. The wrapped and encrypted data received over the first secure connection can identify the first node as a destination, and rewrapping the unwrapped data using the corresponding second secure connection can include re-designating the destination as the subsequent hop in the network.

One or more embodiments described herein can include a method for transmitting encrypted data over a network, the method including: receiving encrypted data from a source through a first secure connection, the encrypted data being wrapped, by the source, using the first secure connection, the wrapping causing an additional layer of encryption for the encrypted data, unwrapping the wrapped and encrypted data, determining whether one more routing parameters are met based on the unwrapped data, in response to determining that the one or more routing parameters are met, identifying a corresponding second secure connection, rewrapping the unwrapped data using the corresponding second secure connection, and transmitting the rewrapped data to a subsequent hop in the network using the corresponding second secure connection.

The method can optionally include one or more of the abovementioned features and/or one or more of the following features. For example, the first secure connection can be different than the corresponding second secure connection. The first secure connection can be different than and separate from the corresponding second secure connection, and the first secure connection and the corresponding second secure connection can be associated with the source. The first secure connection and the corresponding second secure connection can be associated with an IP address of the source. In some implementations, identifying the corresponding second secure connection can include checking a correspondence table to determine whether the first secure connection may be associated with another secure connection. The another secure connection can include the corresponding second secure connection.

The devices, system, and techniques described herein may provide one or more of the following advantages. For example, the disclosed technology can provide a transit network for obfuscating a final destination of client traffic from unfriendly locations, thereby resolving privacy and security vulnerabilities known to the TOR protocol and other similar transit protocols or multi-hop topologies. The disclosed technology can also implement covert entry points to the transit network to avoid detection of connections from end users in the field. Utilizing zero trust and zero knowledge principles, the disclosed technology ensures that transit nodes are not capable of decrypting sensitive data and that the nodes only know the next hop destination. The transit network may further be designed innocuously to prevent suspicion of its true intent. The disclosed technology can leverage infrastructure-as-code (IaC) for rapid deployment and decommissioning to minimize discovery risk.

Moreover, the disclosed technology can use a single point of failure mitigation techniques to ensure a single zero day does not compromise the entire network. The use of honeypot servers at each of the transit nodes in the network may also provide intrusion detection for advanced warning of attempts to compromise the network, the data in transit, and/or any of the transit nodes themselves. The honeypot servers may use enterprise security software stacks to provide intrusion detection without appearing suspicious. Spreading the transit nodes across multiple jurisdictions may advantageously prevent adversaries from determining the final destination based on ISP or hosting provider logs, thereby reducing risk of potential compromise by malicious actors/adversaries. For example, transit entry nodes can be put in unfriendly jurisdictions to avoid suspicious connections without compromising privacy of the final destination.

As yet another example, the disclosed technology is flexible—the transit nodes can be traffic and protocol agnostic to enable the network to be used for multiple different services. The disclosed technology may also be physically secure—highly resilient secure hosting facilities can be provided for the final destination server. Such technology may also be scalable with streamlined and efficient deployment and maintenance procedures. Similarly, cryptographic hardware security module (HSM) technology and techniques can be implemented with the disclosed technology to further secure the sensitive data at the final destination. These advantages, whether taken alone or in combination, provide technical solutions for the technical problems of privacy and security vulnerabilities that stem from the use of the TOR protocol and other similar data transit protocols or multi-hop topologies.

The details of one or more implementations are set forth in the accompanying drawings and the description below. Other features and advantages will be apparent from the description and drawings, and from the claims.

BRIEF DESCRIPTION OF THE DRAWINGS

FIG. 6B is a conceptual diagram of packet and acknowledgement transmission in private sessions of the network.

Figure 1A:
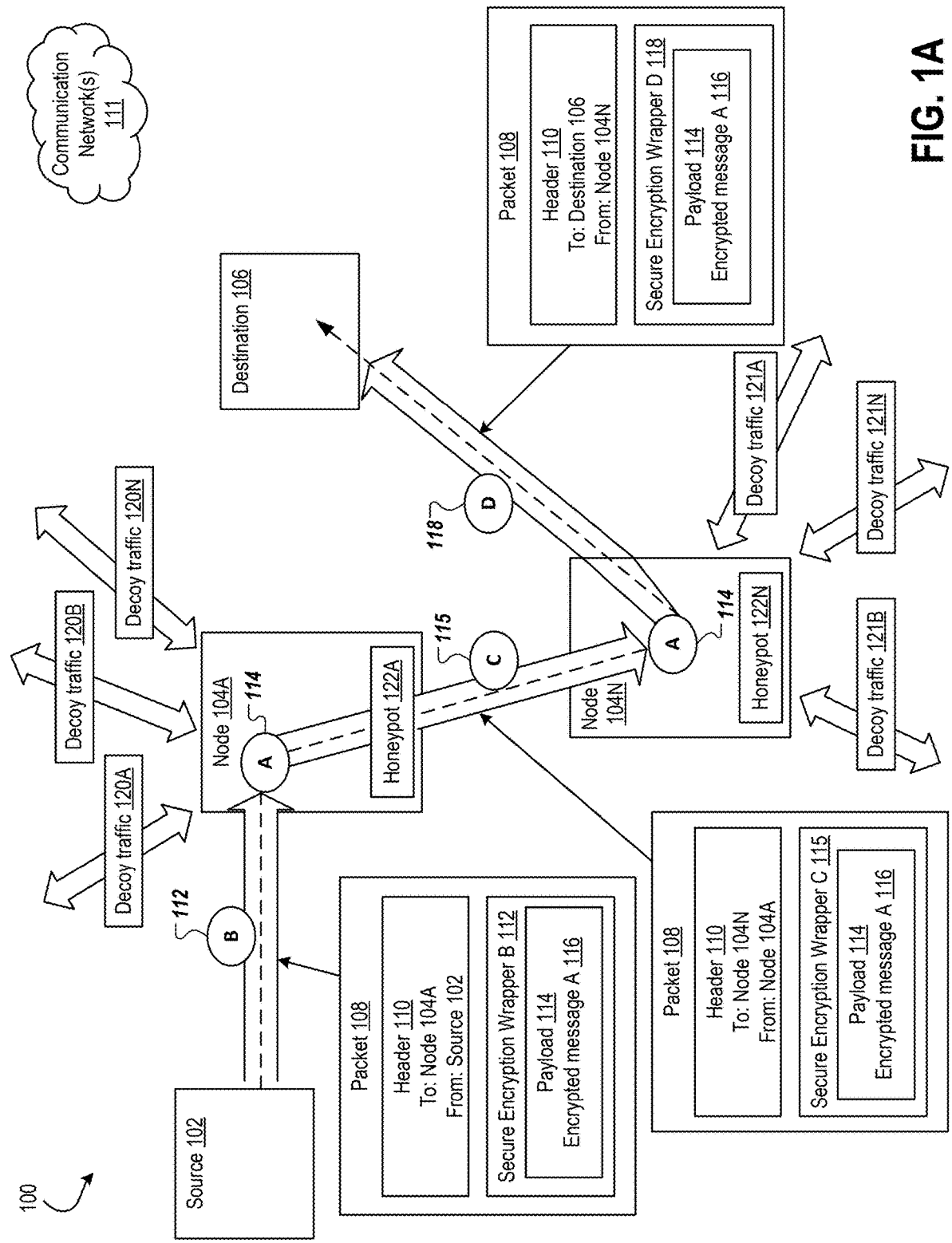
FIG. 1A is a conceptual diagram of a network for securely transmitting encrypted data through the network while obfuscating a final destination for that data.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE EMBODIMENTS

This disclosure generally relates to technology for securely passing data (e.g., traffic) through a network, such as a transit network. More specifically the disclosed technology can be used to obfuscate the network traffic to prevent identification of traffic ingress to the network and obscure the traffic's final destination. The disclosed technology provides technical solutions to technical problems grounded in privacy and security vulnerabilities of transit network protocols, such as the Tor protocol or other types of multi-hop topologies.

Moreover, the disclosed technology can be used in a variety of different environments and use cases. As merely illustrative, non-limiting examples, the disclosed technology can be used to prevent disclosure of network and/or physical locations of radio IP relay in both directions. This obfuscation can be advantageous to prevent ownership attribution of relays placed in hostile locations as well as prevent a communication partner from knowing the location of the relay in the hostile area. To further improve disclosed technology's flexibility in this illustrative scenario, a preconfigured node with physical input/output ports can be developed to enable end users to plug in their radio IP relay without the need of additional training or technical expertise. By placing the preconfigured node between radio IP relays A and B, for example, neither side will know where the other is located based on network traffic patterns. The preconfigured node can be, in some implementations, a physical device placed between the radio IP relay and its existing IP connection.

As another illustrative, non-limiting example, the disclosed technology can be used to prevent disclosure of command-and-control origin and destination. Similar to the radio IP relay example described above, the disclosed technology can prevent attributing the origin and destination of network traffic used for command and control of a variety of different systems, including but not limited to servers, internet of things (IoT), Supervisory Control and Data Acquisition (SCADA), targeting systems, Unmanned Aircraft Systems (UAS), or other systems that may use IP network links. The disclosed technology may not only prevent direct attribution from a side being controlled but can also prevent network attribution to an endpoint that is being controlled. To further improve this technology's performance in latency sensitive but high bandwidth use cases (e.g., UAS control), Quality-of-Service (QoS) can be optionally implemented to ensure that latency sensitive traffic is given a higher priority over other traffic. For example, if software commands must be covertly issued to a computer in location C from a server in location D, by routing the commands through a secure network as described herein, neither the computer in location C nor the server in location D will know the network location of the other. As another example, a drone (e.g., UAS) in location A has a command-and-control link to a pilot in location B. By implementing the disclosed technology between the drone and the pilot, neither the drone nor the pilot will know the location of the other based on network traffic patterns and analysis.

As another illustrative, non-limiting example, the disclosed technology can be used to send data in a way that can bypass firewalls that would otherwise block the traffic due to IP geolocation or the signature of the type of traffic. Additionally, due to the inconspicuous nature of how the traffic is handled using the disclosed technology, it can be less likely to detect that traffic then block it by the firewall. The disclosed technology can create bespoke software clients to further disguise traffic types as traffic enters/exits the disclosed network. The disclosed technology can additionally or alternatively implement additional randomized network traffic padding to prevent identification of tunneled traffic. The disclosed technology can additionally or alternatively create the ability to pass the disclosed traffic through third-party applications (e.g., utilizing an existing video conferencing application as transit mechanism) to further enhance the ability to send data in a way that bypasses firewalls. As an example, a device in location A needs to send data to a server in location C but cannot send it directly due to a firewall preventing connections to location C. By placing a preconfigured node using the disclosed technology in location B, the device can connect to the preconfigured node in location B, which then routes traffic onward to its final destination in location C. As another example, a server in location X needs to send data to a device in location Y using an application or protocol that is blocked by a firewall in location Y. By placing the preconfigured node in location X and tunneling the traffic to another preconfigured node using the disclosed technology in location Y, the firewall in location Y may not block the traffic since it is encrypted within the tunnel of the disclosed technology. As mentioned, the above examples are merely illustrative use cases of the disclosed technology and are not intended to be limiting. The disclosed technology can be used in various other systems, environments, and use cases as will be realized in the following disclosure.

Referring to the figures, FIG. 1A is a conceptual diagram of a network 100 for securely transmitting encrypted data through the network 100 while obfuscating a final destination 106 for that data. The network 100 can include a source 102, nodes 104A-N (e.g., transit nodes), and a destination 106, all of which may communicate over one or more communication network(s) 111. The source 102 and the destination 106 can each be any type of computer, computer system, and/or computing device. As an example, the source 102 can be a client device or an endpoint device, as described further in reference to at least FIGS. 2A and 2B. The source 102 can be configured and programmed to generate data or otherwise request that the data be transferred, via the network 100, to the destination 106. The data can be encrypted at the source 102 using a private key. Once the data is received at the destination 106, only the destination 106 has the key to decrypt the data. The destination 106 can be a destination server having storage, such as secure storage.

Figure 1B:
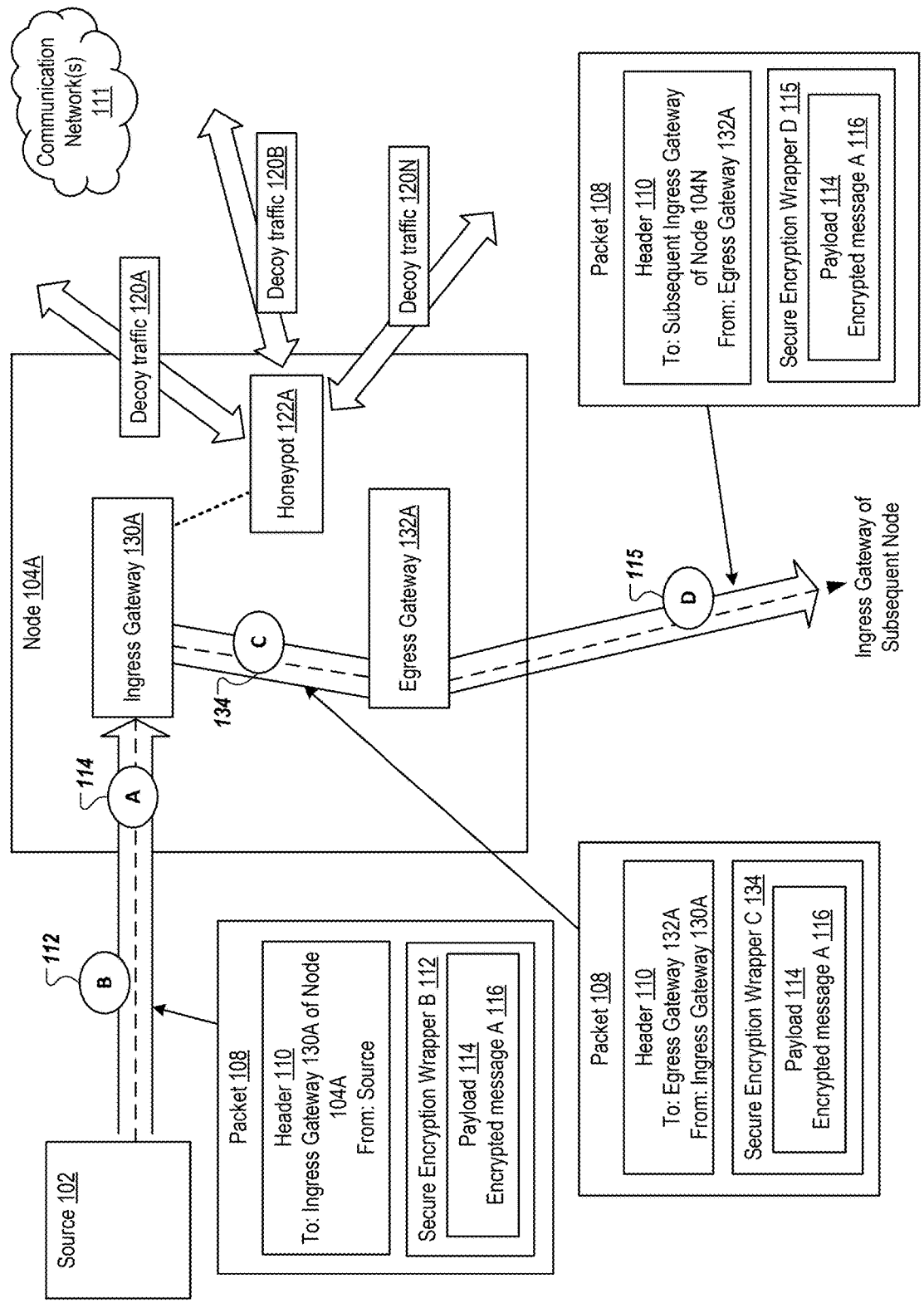
FIG. 1B is a conceptual diagram of a node in the network of FIG. 1A that encrypts data in transit using multiple secure connections.
Figure 2A:
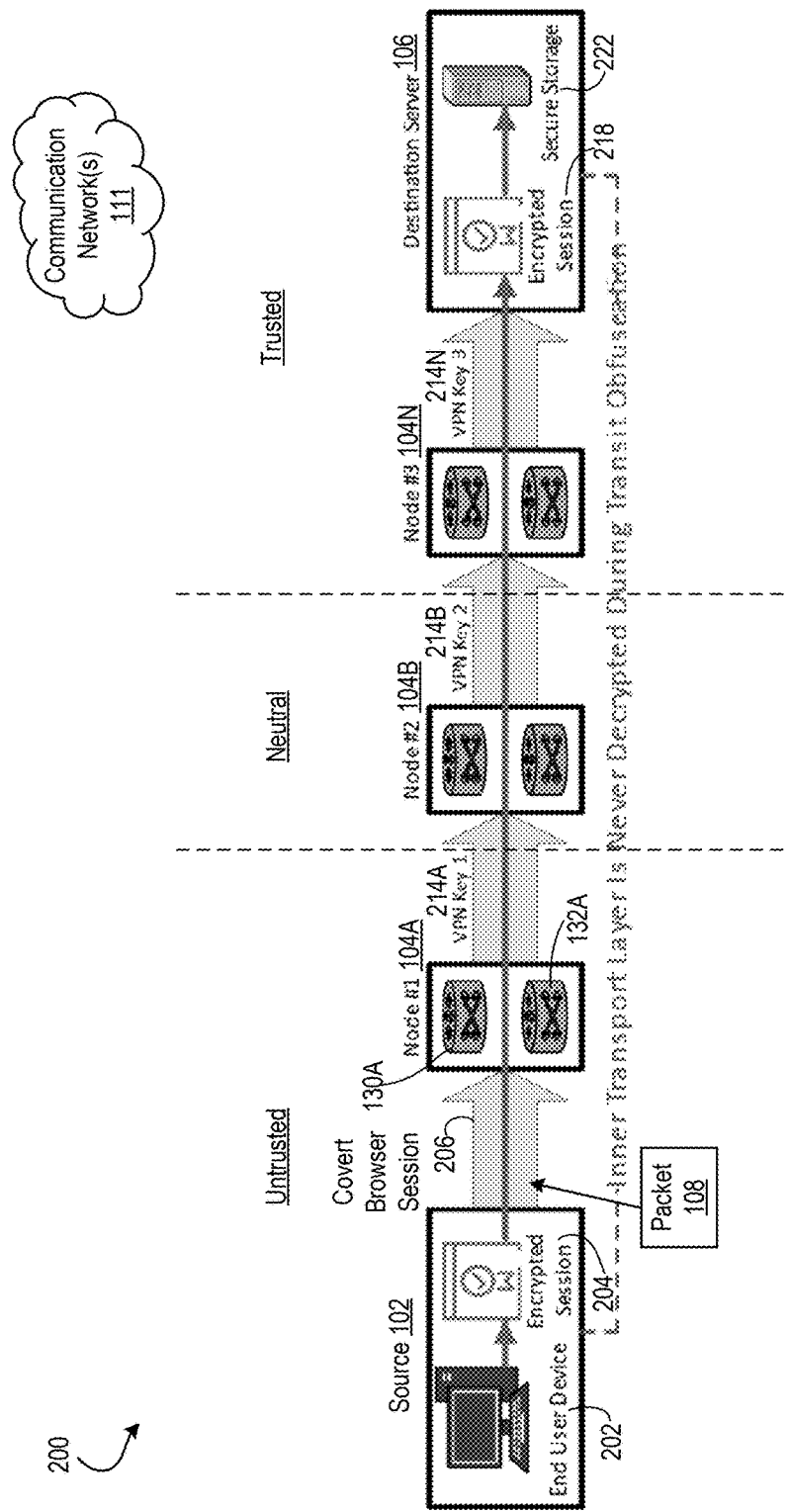
FIG. 2A is a conceptual diagram of a network for securely transmitting encrypted data through the network.
Figure 2B:
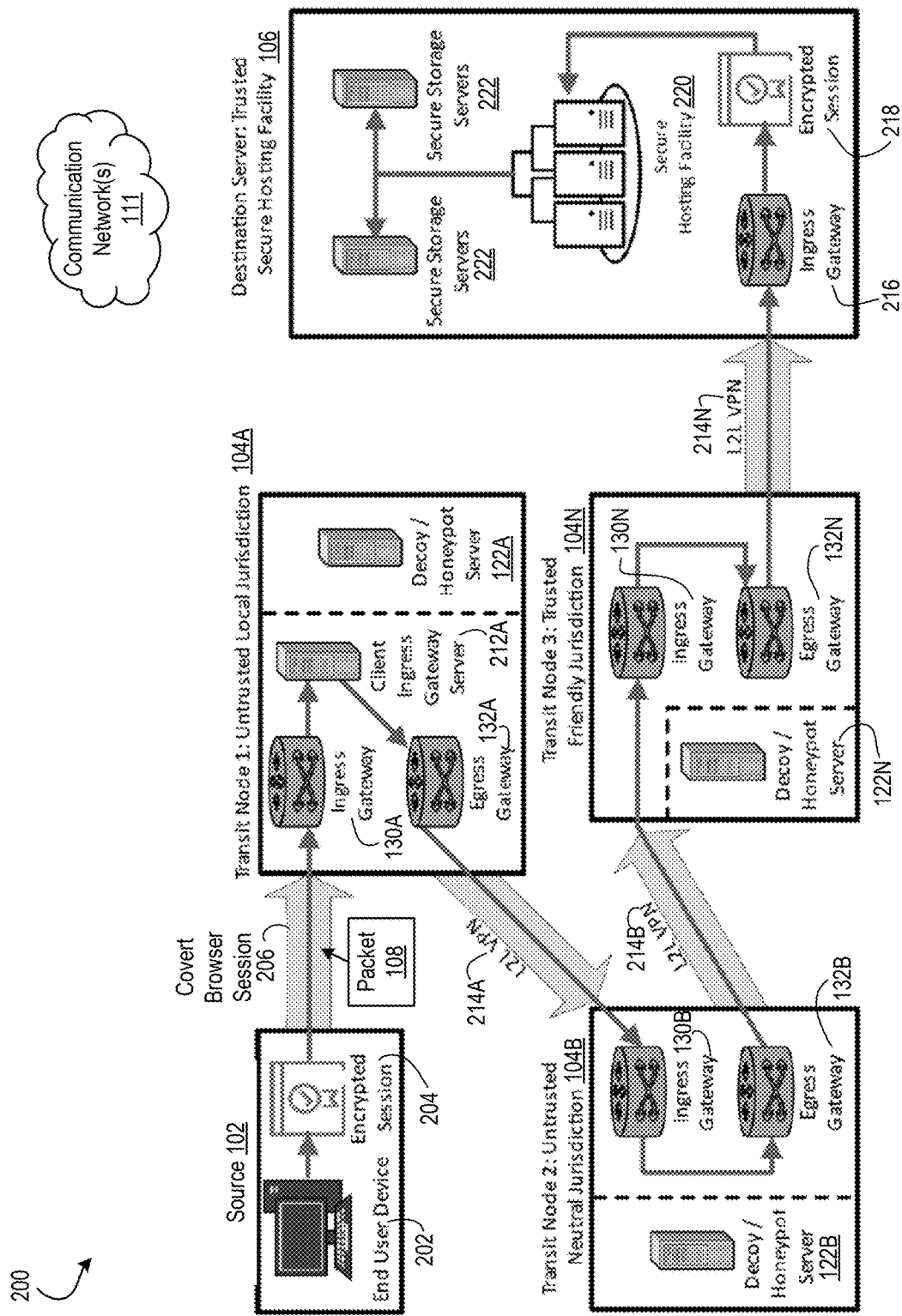
FIG. 2B is another conceptual diagram of the network of FIG. 2A for securely transmitting encrypted data through the network.

The nodes 104A-N can include physical and/or cloud-based computing systems, which can be programmed and configured to route the data through the network 100 using the disclosed techniques. As described herein, each node 104A-N may only know a next hop destination, not the final destination 106, or even the source 02. This configuration can improve the privacy and security of the network 100 so that if any of the nodes 104A-N is compromised by a malicious actor, the other nodes are not also compromised. Refer to FIGS. 1B, 2A, and 2B for further discussion about the nodes 104A-N.

Sometimes, the source 102 may be untrusted. The destination 106 may be trusted. One or more of the nodes 104A-N may be untrusted, trusted, or neutral. Regardless of whether the components of the network 100 are untrusted, trusted, or neutral, the architecture and functionality of the network 100, as described herein, allows for the secure transfer of data throughout the network 100 with zero trust and zero knowledge.

As shown in FIG. 1A, traffic between the nodes 104A-N can be encrypted using a wrapping layer of encryption provided by unique secure connections (e.g., VPN connection) between and amongst the nodes 104A-N. Only the relevant traffic may be passed through the nodes 104A-N to prevent potential compromise of the destination 106. The traffic can be passed along agnostically from node to subsequent node until the traffic reaches the destination 106. Each of the nodes 104A-N may not know a particular encrypted message A 116 in a payload 114 of a packet 108 of data that is transferred through the network 100 because that encrypted message A 116 remains encrypted from the moment it is transmitted by the source 102 and then subsequently wrapped with additional layers of encryption from the secure connections between the nodes 104A-N. Although each of the nodes 104A-N may not know what the encrypted message A 116 actually includes or says, the nodes 104A-N may know an associated port number and/or protocol, which can be used for purposes of transmitting the packet 108 containing the encrypted message A 116 through the network 100 to the destination 106.

Multiple hops can be used in the network 100 to route the packet 108 to the destination 106, where each hop only knows a next destination. For example, the node 104A only knows the next hop destination, which can be the node 104N, but does not know the destination 106 or any other nodes before or after the node 104N. Such hop configuration for the network 100 can enable destination obfuscation, even if one of the nodes 104A-N is compromised. In some implementations, routing of the packet 108 down a chain of the nodes 104A-N may use private host names or known private IP addresses for the nodes 104A-N. As a result, each of the nodes 104A-N knows where next the packet 108 goes, but such transit can be accomplished in a way that the private host names are meaningless to someone outside of the network 100, such as a potentially malicious actor. The potentially malicious actor may not, for example, be able to discern, from the private host names or the private IP addresses, whether the packet 108 is traveling within one internal network, multiple networks, or other information about the network 100 that may be used to compromise it.

Network address translation (NAT) techniques can be used at multiple points within one or more of the transit nodes 104A-N to make it more difficult for potential malicious actors to find and identify the data (e.g., the packet 108) as it transits through the respective node. Natting allows for modifying source and/or destination IP addresses in the packet 108 as the packet 100 passes through a transit node. In some implementations, one or more of the nodes 104A-N can be set up with multiple layers of natting. The nodes 104A-N can be set up with 2 separate and distinct layers of natting. In an illustrative example, an ingress gateway and an egress gateway of a node (refer to at least FIG. 1B for further discussion about the ingress and egress gateways) can be handled by separate components (e.g., hardware components, virtual machine components). The handling by separate components allows for double natting to occur in the node. Separation of these 2 gateways provides a level of abstraction and control over network traffic that enables the use of multiple layers of natting in a way that is efficient and manageable. Multiple layers of natting can advantageously allow for multiple layers of security. For example, the ingress gateway can isolate internal services from external systems by applying certain security policies. The egress gateway can enforce additional policies on outgoing traffic to add additional layers of security. The separation of the 2 gateways further makes it easier to manage traffic between internal services of the node and external nodes and/or networks. The ingress gateway can, for example, ensure that incoming traffic is correctly handled and routed to the right internal service, while the egress gateway can ensure that outbound traffic to external services, nodes, and/or networks is properly routed and controlled. Accordingly, the separation of ingress and egress gateways enables multiple layers of natting by allowing the network traffic to pass through distinct stages where each gateway applies its own layer(s) of NAT. This implementation can provide flexibility in traffic routing, improve security through isolation, and allow for more granular control of both incoming and outgoing traffic.

As an illustrative example, the ingress gateway can perform a first layer of natting, which can include source NAT (SNAT). SNAT replaces an external source IP with another IP (such as an IP address of the ingress gateway and/or the node having the ingress gateway) to mask the origin of the network traffic (e.g., the packet 108) from an internal network. The egress gateway can perform a second layer of natting, which can include destination NAT (DNAT) on outbound traffic (e.g., the packet 108 after it has been forward to relevant internal services of the node). DNAT can include modifying the source IP address (e.g., replacing the IP address of the ingress gateway or IP addresses of the internal services with the egress gateway's public IP address) so that the network traffic can be routed correctly when it returns. This second layer of natting can ensure that external systems and/or other nodes in the network only see the IP address of the egress gateway, not the internal services' IP or the IP of the ingress gateway.

The nodes 104A-N may also include honeypot servers 122A-N (e.g., decoy servers, honeypots). The honeypot servers 122A-N may be programmed and configured to generate and propagate decoy traffic 120A-N, 121A-N in the network 100 to obscure or camouflage the actual packet 108 that is being transmitted through the network 100 to the destination 106. As a result, the honeypot servers 122A-N can be used to avoid network-based traffic mappings by potentially malicious actors. As an illustrative example, in the event that a malicious actor obtains connection logs or ISP logs, the honeypot servers 122A-N can generate similar-looking traffic to many other locations inside (and/or outside of) the network 100 to take the malicious actor's attention away from the components of the network 100.

The honeypot servers 122A-N can also act as detectors of potential threats or compromises to any of the nodes 104A-N and/or other components of the network 100. For example, the honeypot servers 122A-N may act as targets if the malicious actor were to compromise a particular node. The respective honeypot server would be the first component of the node that the malicious actor would attempt to compromise. That attempt can trigger alerts and/or other automated trigger events of the honeypot server. For example, the honeypot server may generate and return a report about the attempt to compromise. The honeypot server can report the attempt to compromise while still maintaining zero trust principles because the attempt to compromise was not connected to the actual packet 108 being transmitted in the network 100. Rather, the attempt to compromise was connected to the decoy traffic 120A-N, 121A-N generated by the honeypot server. As another example, the honeypot server may apply one or more rules to take immediate, automatic action to stop the malicious actor. As yet another example, if the honeypot server detects an attempt for lateral movement from an ingress gateway of a first node to another node or another gateway, then the honeypot server can check against rules set for the particular use case and/or source 102 to determine whether to just alert on the attempted movement or take immediate and automatic action.

Still referring to the network 100 in FIG. 1A, the source 102 can generate and encrypt a message, the encrypted message A 116, to be transmitted to the destination 106. The source 102 can encrypt the message 116 using a private key or another encryption scheme or shared secret between the source 102 and the destination 106. Only the destination 106 can decrypt the message 116 using the shared private key or shared encryption scheme/secret.

In the network 100, the encrypted message A 116 can be transmitted from the source 102 to the node 104A in the packet 108 via a secure connection B (112). The secure connection B (112) can be a VPN connection or other similar encrypted, secure communication channel, including but not limited to encrypted Hypertext Transfer Protocol Secure (HTTPS) browser sessions, Cursor on Target (CoT) messages, and/or Web Real-time Communication (WebRTC).

The secure connection B (112) can ensure a second or nth layer of encryption for the encrypted message A 116.

The packet 108 may include a header 110, indicating a component to receive that instance of the packet 108 (e.g., node 104A) and a component that is transmitting that instance of the packet 108 (e.g., the source 102). The packet 108 may also include a payload 114, which further includes the encrypted message A 116. As described herein, the encrypted message A 116 may not be decrypted by any of the nodes 104A-N in the network 100, which further secures the message 116 against any potential intrusions or compromises.

Transmitting the packet 108 via the secure connection B (112) between the source 102 and the node 104A can include wrapping the payload 114 of the packet 108 in a secure encryption wrapper B (112). The secure encryption wrapper B (112) can provide another layer of security and encryption between the source 102 and the node 104A. The node 104A receives the payload 114 (A) in the packet 108, the payload 114 having been wrapped in the second layer of encryption (B, 112). The secure encryption wrapper B (112) can be decrypted by the node 104A, but the node 104A does not the key used to access the encrypted message A 116 in the payload 114. Moreover, the packet 108 nor the secure encryption wrapper B (112) has any indication of the final destination 106 (as readable or encrypted text), so the node 104A is unable to decrypt or otherwise compromise the encrypted message A 116 in the payload 114.

The honeypot server 122A of the node 104A can generate the decoy traffic 120A-N and send it in various different directions to cause obfuscation of the actual packet 108 as it continues to transmitted through the network 100.

The node 104A may perform additional encryption processes, as described in reference to FIGS. 1B and 2B, before transmitting the packet 108 via another secure connection C (115) between the node 104A and a next/subsequent node (e.g., hop destination). In this example, the next node is the node 104N. Transmitting the packet 108 between the node 104A and the next node 104N can include wrapping the payload 114 of the packet 108 in another secure encryption layer C (115). The packet 108 at the time of adding the secure encryption layer C (115) can now indicate, in the header 110, that the packet 108 derives from the node 104A and is destined for the node 104N. The honeypot server 122N of the node 104N can generate the decoy traffic 121A-N and send it in various different directions to cause obfuscation of the actual packet 108 as it continues to transmitted through the network 100.

As another example, data in the packet 108 can be padded in transit between the nodes 104A and 104N to prevent potential fingerprinting of the data in transit. In other words, the padding can occur within an encrypted tunnel that is established between the nodes 104A and 104N having the keys thereto. A padding amount, as described further below, can be communicated between the nodes via the encrypted tunnel, which can advantageously maintain zero trust. In some implementations, the padding amount can be uniquely established for each encrypted tunnel, then discarded once an associated hop is completed. New padding techniques and/or amount can be used for each hop and/or each encrypted tunnel established between communicating nodes in the network.

The padding can ensure that should an adversary intercept the traffic, they would not be able to identify links between the communication path of that traffic since the traffic packet size would differ between nodes from the padding. The amount of padding at each node can be randomized. Randomized packet padding introduces random noise into the packet size to obfuscate the actual size of the packet. As a result, the packet size may appear random and uniform, thereby preventing a potential adversary from deducing meaningful patterns based on packet size. The padding adds data to the packet to make its total size larger. The randomization can result in two packets carrying similar data having completely different sizes due to the amount of padding applied to each.

The amount of padding or padding length can be communicated to a recipient. The padding length can be communicated through the encrypted tunnel between the nodes. Such communication can maintain zero trust. Communicating the amount of padding to the recipient can be used for correct packet reassembly and/or protocol interpretation. If the message in the packet is encrypted, for example, the amount of padding can be used by the recipient to correctly remove the padding after decryption. In some implementations, if the padding length is communicated indirectly, such as through metadata or part of a message header, the recipient can remove the padding without revealing discernible patterns to an external observer. This can help maintain the security of the randomized padding techniques. The padding length can also be communicated via a known protocol. Once the receiving node removes the padding and processes the unpadded message through services of that node, the node can add their padding before transmitting the newly padded packet/message to a next node in the network.

In some implementations, the padding amount can be determined based on session, in which padding is applied in a way that ensures each session (or communication between two nodes) is handled in a secure and consistent manner. This process ensures that the padding amount is appropriate for each session. The padding amount could vary by session to further enhance the security of the communication. Sometimes, padding can be determined at the beginning of a session based on predefined session parameters, then the amount of padding can be applied consistently across an entire session. As an example, the amount of padding can be based on a length of the data in the session. As another example, the amount of padding can be randomized per packet within the session, with the randomness being based on session-specific parameters. As yet another example, the amount of padding can be dynamically determined by a state of the session or a combination of factors, such as an amount of data already transmitted in the network and/or other network conditions. As another example, cryptographic and/or hash-based methods can be used to determine padding amount. The hash of a session key and/or a combination of session parameters may be used to determine the padding amount. In another example, the padding amount may be communicated at the beginning of the session and/or included as part of a protocol header sent at the start of the communication. Session keys and/or salts may be used in some implementations to determine padding for each session. Salts include random values that can be added to data before applying one or more cryptographic algorithms, such as hashing. Sometimes, the salts may be used as part of an encryption key derivation process to ensure that the key used for encrypting the session data is unique.

In some implementations, the padding can additionally or alternatively include grouping the packets. Packet grouping can ensure that data is broken into appropriate sizes for secure processing or transmission, and padding can fill in any gaps to ensure the data fits into the predetermined packet size. Additionally or alternatively, packets from multiple different sessions can be grouped together and/or processed together. Packets from different sessions can be mixed together using one or more techniques, including but not limited to interleaving, merging, and/or cryptographic mixing. Interleaving can include alternating or shuffling together packets from both sessions. Merging can include appending the packets from the different sessions to create a new, larger stream of data including packets from both sessions. Cryptographic mixing can include combining the session data using operations and/or transformations that are more secure (e.g., by using an XOR operation). The mixed packets can then be organized into predetermined-sized blocks and/or groups (e.g., grouping the mixed packets into chunks of a certain size, such as 128 bytes and/or 256 bytes, which may vary depending on system requirements). Sometimes grouping the packets can include ensuring the packet sizes align with certain requirements (e.g., for block ciphers in encryption), and/or padding to ensure the final group of packets has a desired or predetermined size.

The node 104N may perform additional encryption processes, as described in reference to FIGS. 1B and 2B, before transmitting the packet 108 via another secure connection D (118) between the node 104N and the destination 106. Transmitting the packet 108 between the node 104N and the destination 106 can include wrapping the payload 114 of the packet 108 in another secure encryption layer D (118). The packet 108 at the time of adding the secure encryption layer D (118) can now indicate, in the header 110, that the packet 108 derives from the node 104N and is destined for the destination 106. The honeypot server 122N of the node 104N can continuously generate the decoy traffic 121A-N and send it in various different directions to cause obfuscation of the actual packet 108 as it is transmitted to the destination 106.

Once the destination 106 receives the packet 108, the destination 106 can decrypt the message A 116 using the shared key with the source 102.

Although 2 nodes are shown in the network 100 of FIG. 1A, this configuration is merely an illustrative example. The network 100 may include additional nodes. For example, the network 100 may include 3 nodes. As other non-limiting examples, the network 100 may include 4, 5, 6, 10, 15, 20, etc. nodes.

FIG. 1B is a conceptual diagram of the node 104A in the network 100 of FIG. 1A that encrypts data in transit using multiple secure connections. The node 104A can include an ingress gateway 130A and an egress gateway 132A, in addition to the honeypot 122A. In some implementations, the honeypot 122A may be part of the ingress gateway 130A. Sometimes, the ingress gateway 130A can also perform the functions described herein of the honeypot 122A. The ingress gateway 130A can, for example, perform the handoff of the data to a next destination (such as the egress gateway 132A) and route the data based on whether the data is identifiable as traffic for secure routing or decoy traffic (e.g., traffic that is generated by the functionality of the honeypot 122A). Sometimes, the ingress gateway 130A can include a reverse web proxy, which can filter the traffic based on its characteristics (e.g., a particular URL, subdomain, traffic identifier). As described herein, the ingress gateway 130A can perform additional layers of authentication to further route the data down the secure transit network to non-decoy routing components (e.g., the egress gateway 132A). The authentication can be session-based authentication. Sometimes, the authentication can be source IP-based authentication. The authentication can include checking IP addresses or other packet/data information by the ingress gateway 130A. Refer to at least FIG. 6B for further discussion.

Each of the nodes described herein may include one or more ingress gateways, more egress gateways, and/or one or more honeypots. Having the ingress gateway 130A and the egress gateway 132A within the node 104A creates a gap, thereby making the node 104A quantum secure. The ingress gateway 130A and the egress gateway 132A can be any type of gateway server configured and programmed to determine what information should be passed along in network traffic. In some implementations, the ingress gateway 130A and/or the egress gateway 132 can be any type of software, containerized asset, hardware, or cloud-based system.

The ingress gateway 130A can be programmed and configured to host a preferred type of connectivity that the source 102 desires to use. The packet 108 described herein can then be routed through the ingress gateway 130A and the egress gateway of the node 104A and any other nodes in the network described herein so that even if a malicious actor compromises the ingress gateway 130A, the ingress gateway 130A is not tied to the egress gateway 132A in any way that the malicious actor could then compromise the egress gateway 132A. This configuration and architecture of the node 104A (and the other nodes described herein) provides an additional layer of protection. As a result, the malicious actor would have to compromise all the nodes in the transit chain to find out the final destination of the encrypted message A 116 in the packet 108.

As described herein, the node 104A does not know the final destination of the encrypted message A 116 in the packet 108. The ingress gateway 130A and the egress gateway 132A only know that when certain parameters are met, they can route the encrypted message A 116 in the packet 108 to a next destination, such as an ingress gateway of a next node or an egress gateway of the same node. Secure encryption of the payload 114 having the encrypted message A 116 can also be performed between the ingress gateway 130A and the egress gateway 132A, thereby creating an additional layer of encryption as the encrypted message A 116 is transmitted through the transit chain. The secure encryption between the ingress gateway 130A and the egress gateway 132A is also unique and distinct from the secure encryption between the source 102 and the ingress gateway 130A of the node 104A and between the egress gateway 132A and an ingress gateway of a subsequent node in the transit chain. An encryption key from one relationship (e.g., between the ingress gateway 130A and the egress gateway 132A) therefore cannot be used to decrypt a secure encryption in another relationship in the transit chain since every relationship is independent of each other. Since none of the components (e.g., the source 102, the node 104A, the ingress gateway 130A, the egress gateway 132A) in the network share the same encryption, the encrypted message A 116 is secured in many layers. Accordingly, the disclosed technology operates in a zero trust environment and every component in the network has zero knowledge of the other components in the network, with the exception of the two immediate components (e.g., the ingress gateway 130A and the egress gateway 132A).

Still referring to FIG. 1B, the payload 114 can be wrapped in the secure encryption wrapper B (112) by the source 102 then transmitted to the ingress gateway 130A of the node 104A, described further in reference to FIG. 1A. As shown in FIG. 1B, the packet 108 is being transmitted from the source 102 to the ingress gateway 130A of the node 104A (see the header 110). Once the ingress gateway 130A receives the packet 108, the ingress gateway 130A can check the packet 108 against one or more transit parameters. The parameters can include but are not limited to identification of source IP address, client authentication techniques performed at the receiving ingress gateway of the node (e.g., the ingress gateway 130A of the node 104A), analysis of browser cookies, and/or URL(s) associated with the packet 108. Any combination of such parameters may be used for checking the packet 108. In some implementations, only one of the parameters may be used for checking the packet 108. Sometimes, multiple of the parameters may be used for checking the packet 108. If the parameters are met, the ingress gateway 130A can wrap the payload 114 in the packet 108 using a secure encryption wrapper C (134) and transmit the packet 108 via/using a secure connection between the ingress gateway 130A and the egress gateway 132A (see the header 110). As described herein, the secure encryption wrapper C (134) is unique and different from any of the other secure encryption wrappers described herein.

Upon receiving the packet 108, the ingress gateway 130A can perform one or more client authentication methods. The client authentication methods may sometimes be performed at each ingress gateway of a network, such as in the network 200 of FIG. 2A. In some implementations, the client authentication methods may only be performed at a first ingress point of the network, such as at a first node (e.g., the node 104A) in FIG. 1B. The authentication methods can be performed to differentiate between decoy server traffic and authorized network traffic. By performing the authentication methods, the ingress gateway 130A can determine whether to route the inbound traffic (e.g., the packet 108) through the honeypot 122A or through the normal traffic network (e.g., through services in the node 104A to the egress gateway 132A and then to a next node in the network).

Example authentication techniques include, but are not limited to, credential authentication, certificate authentication, and/or cookie authentication. Credential authentication can include verifying a user's identity based on something they know, such as a username and password, or something they have, such as a PIN or other unique identifier. Certificate authentication can use digital certificates to verify the identity of a user or a system. Cookie authentication can include maintaining an authenticated session for a user through the use of cookies—once a user has successfully authenticated, a session cookie can be set in the user's browser to allow subsequent requests to be identified as coming from the same authenticated user.

Sometimes one or more passthrough authentication mechanisms may also be implemented and performed by one or more other sources, such as systems and/or services that are external to the node 104A. Passthrough authentication advantageously delegates the authentication process to a trusted third party system, which can be responsible for validating credentials and/or the packet 108. Example passthrough authentication mechanisms can include single sign-on (SSO) and/or federated authentication.

In some implementations, additional obfuscation techniques can be performed within the node 104A between the ingress gateway 130A and the egress gateway 132A. Such obfuscation techniques can include implementing natting, as described above in reference to FIG. 1A, which can further make it difficult for malicious actors to determine where traffic is being routed to within the node 104A when the traffic moves from the ingress gateway 130A to the egress gateway 132A. Natting can, for example, hide internal IP addresses of the ingress gateway 130A and the egress gateway 132A. As a result, the malicious actors, or other external entities, only see public IP addresses and port numbers, not the specific private IP addresses of the ingress gateway 130A and the egress gateway 132A of the node 104A. Such techniques provide an additional layer of obfuscation and security, since the malicious actor or other external entities cannot directly access the ingress gateway 130A or the egress gateway 132A or infer their private IP addresses. Although natting is described from the perspective of the node 104A, natting can also be applied and used with respect to each of the nodes 104A-N in the secure transit network described herein.

Once the egress gateway 132A receives the packet 108, it can check the packet 108 against one or more of the same or different transit parameters. If the parameters are met, the egress gateway 132A can wrap the payload 114 in the packet 108 using another secure encryption wrapper D (115), and then transmit the packet 108 via another secure connection between the egress gateway 132A and the ingress gateway of the subsequent node in the transit chain. All the while, the honeypot 122A can generate and transmit the decoy traffic 120A-N. Such operations can be performed at each of the nodes in the transit chain, until the packet 108 reaches the final destination. Refer to at least FIG. 4 for further discussion about operations performed at each of the nodes, such as the node 104A.

FIG. 2A is a conceptual diagram of a network 200 for securely transmitting encrypted data through the network 200. The network 200 is similar to the network 100 described above. The network 200 can include one or more components of the network 100. The network 200 may include one or more other or additional components.

In the network 200, one or more of the components can be untrusted, neutral, and/or trusted. Regardless of what components may be trusted, the architecture and configuration of the network 200 allows for secure transmission of data between components in a zero trust environment. For example, the source 102 and the node 104A may be untrusted components in the network 200. The source 102 can be a client computing device, a client endpoint, or any other endpoint that can request the transmission of the packet 108 to the destination 106. The source 102 may include, for example, an end user device 202, which can generate and send the request for transmission. The source 102 can begin an encrypted session 204 during which the packet 108 can be transmitted securely through the network 200 to the final destination 106. Inner transport layers provided by the nodes 104A-N may not be decrypted during transit obfuscation, as described herein.

The source 102 can transmit the packet 108 containing an encrypted message to the node 104A via a secure connection 206. The packet 108 can transmitted as covert traffic, using one or more techniques, such as SSL and/or VPN. More specifically, the packet 108 is routed from the source 102 to the ingress gateway 130A of the node 104A. As described herein, the secure connection 206 can be an encrypted connection, such as a covert browser session, a standard browser session, and/or a covert VPN, which can provide for wrapping the encrypted message in the packet 108 in an additional layer of encryption. Once the ingress gateway 130A checks the packet 108 against transit parameters, the ingress gateway 130 can route the packet 108 to the egress gateway 132A of the node 104A via another secure connection.

The egress gateway 132A of the node 104A can transmit the packet 108 having the encrypted message to a next node in the chain, node 104B, via another secure connection 214A. As an illustrative example, the secure connection 214A can be a VPN key 1. The node 104B may be a neutral component or party in the network 200. The same operations described here in reference to the node 104A and its components can be performed at the node 104B. The node 104B can then transmit the packet 108 having the encrypted message to a next node in the chain, such as node 104N, via another different secure connection 214B. As an example, the secure connection 214B can be a VPN key 2. The node 104N can be a trusted component or party in the network 200, as an illustrative example. The same operations described in reference to the node 104A and its components can be performed at the node 104N. The node 104N can then transmit the packet 108 with the encrypted message to a next destination in the chain, which may include another node or the destination 106, via another different secure connection 214N. As an example, the secure connection 214N can be a VPN key 3. The destination 106 can be a trusted component or party.

Upon receiving the packet 108, the destination 106 can use a private shared key with the source 102 to decrypt the message in the packet 108 in an encrypted session 218. The destination 106 may store the decrypted message in secure storage 222. The destination 106 may use the decrypted message to perform or execute one or more different operations. For example, these techniques can be used with encrypted HTTPS browser sessions for a variety of purposes, such as a proof of concept (PoC) using web browser-delivered virtual desktop infrastructure (VDIs). PoC in web browsers can be used for demonstrating or testing new concepts or vulnerabilities. VDIs can include infrastructure that allows users to access virtualized desktop environments from various locations, networks, and/or devices. These techniques can additionally or alternatively be used for COT messaging and/or WebRTC streaming.

FIG. 2B is another conceptual diagram of the network 200 of FIG. 2A for securely transmitting encrypted data through the network 200. As described herein, traffic (e.g., the packet 108 having an encrypted message) can originate at the end user device 202 of the source 102 in the encrypted session 204. This traffic may not be decrypted as it is transmitted through the network 200, thereby providing a zero trust and zero knowledge way of secure transmission. Separate and distinct secure encryption connections can be established between components of the network 200. For example, the secure connection 206 can be established between the source 102 and the node 104A. Another secure connection 214A is established between the node 104A and the node 104B. Another secure connection 214B is established between the node 104B and the node 104N. Yet another secure connection 214N is established between the node 104N and the destination 106. Using all the secure connections in the network, an entire communication between the source 102 and the destination 106 can be encrypted. The example network 200 includes three nodes 104A-N, although additional or fewer nodes may also be used in the network 200 to perform the disclosed techniques.

To enhance covert access to the network 200, entry transit nodes, such as the node 104A, can be placed locally to the source 102 that is accessing the network 200. This configuration can prevent a malicious actor that is inspecting the source 102's traffic from identifying the connection 206 (e.g., covert browser session) between the source 102 and the node 104A as suspicious and worth further investigation. As shown in FIG. 2B, the node 104A can be part of an untrusted local jurisdiction. The node 104A includes the ingress gateway 130A, the egress gateway 132A, a client ingress egress gateway server 212A, and/or the honeypot 122A (e.g., decoy server). In some implementations, the honeypot 122A may be optionally included in the node 104A. Sometimes, the honeypot 122A may be part of the node 104A (or any of the other nodes) if desired by user input at the end user device 202 of the source 102.

As described herein, the packet 108 can pass from the source 102 to the ingress gateway 130A via the secure connection 206. In the connection 206, the encrypted message of the packet 108 can be wrapped with a secure encryption layer. The server 212A can check the packet 108 received at the ingress gateway 130A against transit parameters before wrapping the encrypted message in the packet 108 in another layer of encryption and passing the packet 108 to the egress gateway 132A. The egress gateway 132A can perform a similar check of transit parameters before wrapping the encrypted message in the packet 108 with yet another layer of encryption and passing the packet 108 to an ingress gateway 130B of the node 104B via the secure connection 214A. In some implementations, the node 104B can be part of an untrusted neutral jurisdiction. Although not depicted, the node 104B may include a client ingress gateway server similar to the server 212A to perform one or more operations described above in reference to the node 104A. For example, components of the node 104B can check the received packet 108 against transit parameters, before wrapping the message in the packet 108 in another, different secure encryption and passing the packet 108 to a next destination via that secure encryption connection. The ingress gateway 130B can pass the secured and encrypted packet 108 to an egress gateway 132B of the node 104B. The egress gateway 132B can then check the packet 108 against transit parameters before wrapping the encrypted message in the packet 108 in another layer of encryption and passing the packet 108 via the secure connection 214B to an ingress gateway 130N of the node 104N. A honeypot 122B of the node 104B can also be configured to continuously generate and transmit decoy traffic in the network 200 to obfuscate the packet 108 as it moves from destination to destination.

In some implementations, the node 104N can be part of a trusted, friendly jurisdiction. Although not depicted, the node 104N may include a client ingress gateway server similar to the server 212A to perform one or more operations described above in reference to the node 104A. For example, components of the node 104N can check the received packet 108 against transit parameters, before wrapping the message in the packet 108 in another, different secure encryption and passing the packet 108 to a next destination via that secure encryption connection. The ingress gateway 130N can pass the secured and encrypted packet 108 to an egress gateway 132N of the node 104N. The egress gateway 132N can then check the packet 108 against transit parameters before wrapping the encrypted message in the packet 108 in another layer of encryption and passing the packet 108 via the secure connection 214N to an ingress gateway 216 of the destination 106. A honeypot 122N of the node 104N can also be configured to continuously generate and transmit decoy traffic in the network 200 to obfuscate the packet 108 as it moves to the final destination 106.

The destination 106 can be a trusted, secure hosting facility or server, in some implementations. The destination 106 may establish the encrypted session 218 during which the encrypted message in the packet 108 can be decrypted using the shared key or other encryption scheme from the source 102. Once the message is decrypted, such data can be transmitted to a secure hosting facility 220 of the destination 106. The data may be stored in one or more secure storage servers 222 and/or used in one or more different operations that can be executed/performed at the destination 106 (and at the request of the source 102). The secure storage servers 222 can include any type of database, data store, and/or cloud-based storage and services. Sometimes, the secure storage servers 222 may include general public connectivity via networks such as the Internet.

The disclosed network 200 can be flexible and designed to implement a diverse set of cloud and/or hardware components. Spreading the nodes 104A-N across different cloud and/or hardware components can provide improved security by preventing a single exploit from being able to compromise the entire network 200. It also enables the network 200 to be rapidly deployed and decommissioned, minimizing the time that a malicious actor must identify a node in the network 200.

Referring to both FIGS. 2A and 2B, in some implementations, the hops in the network 200 can be manually set up or otherwise predetermined. As a result, no single node in the network 200 may have information about other hops. Sometimes, load balancing can be performed within each zone of nodes in the network 200. The network 200 can be comprised of 1-N zones, each of the zones further comprising 1-N nodes. The nodes in each zone can be load balanced between each other such that if 1 node goes down, the remaining chain may not be prevented from functioning as expected. The nodes in each zone can be arranged with traditional load balancing techniques. A load balancer can be used in the network 200 and configured to receive incoming requests and decide where to send each request in a zone. The decision made by the load balancer can be based on capacity of each node per zone and/or whether a node is currently up or down, etc. In some implementations, requests can be distributed sequentially across all nodes in a cycle or session. As another example, the requests can be directed to nodes with fewest active connections, which can be beneficial where the nodes have different capabilities. Sometimes, a client's IP address can be used to assign a node, such that each client may connect to a same server, which is beneficial for session persistence. As another example, more traffic can be assigned to nodes with higher capacity and/or performance. In yet some implementations, a node can be randomly selected to receive a request, which can be beneficial in distributed environments. The load balancing can beneficially ensure high availability, improve performance in the network 200, and enable efficient resource use across the network 200. The load balancing can also allow for redundancy, which can make it easier to manage maintenance and/or unexpected failures without affecting service across the network 200.

Figure 3:
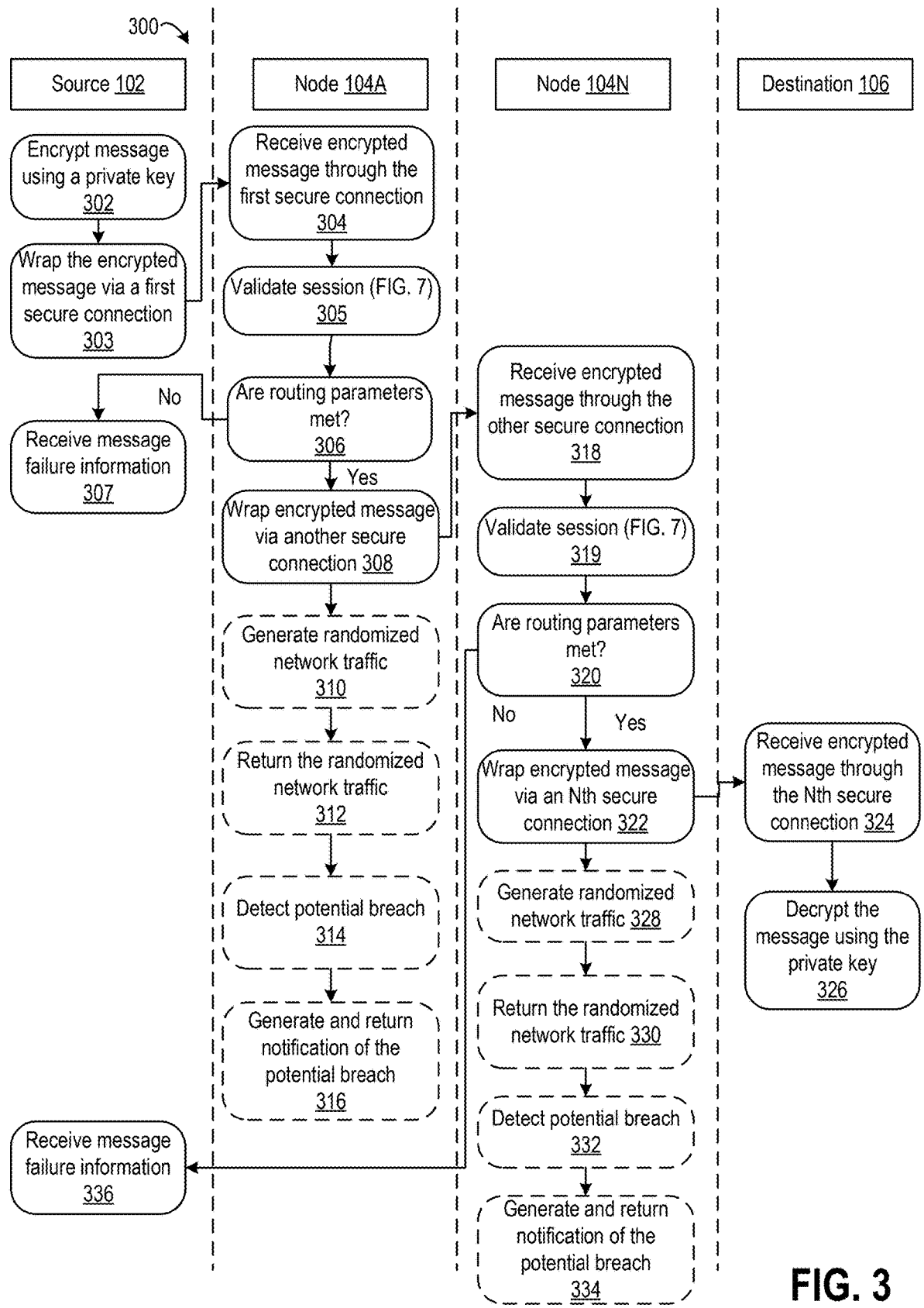
FIG. 3 is a swimlane diagram of a process for securely transmitting encrypted data through a network using the disclosed technology.

FIG. 3 is a swimlane diagram of a process 300 for securely transmitting encrypted data through a network using the disclosed technology. The process 300 can be performed with one or more components described herein. For example, the process 300 is described from the perspective of the source 102, the node 104A, the node 104N, and the destination 106. The process 300 can also be performed using other components described throughout this disclosure or other similar components. Although the process 300 is described from the perspective of the node 104A and the node 104N, the process 300 can be performed with additional nodes, such as nodes 104B, 104C, 104D, 104E, etc., or any other combination of nodes in a secure transit network. As another illustrative example, the process 300 can be performed using three of the nodes 104A-N.

Referring to the process 300 in FIG. 3, the source 102 can encrypt a message using a private key or other encryption scheme (block 302). Refer to FIGS. 1A, 1B, 2A, and 2B for further discussion.

The source 102 can wrap the encrypted message via a first secure connection in block 303. The first secure connection can be established between the source 102 and an entry transit node, such as the node 104A. The first secure connection can be a unique and distinct encryption scheme compared to any other secure connections described and used in the process 300. As a result, the first secure connection can provide a unique wrapper and encryption scheme that only the entry transit node, the node 104A, can decrypt. As described herein, the first secure connection can include a VPN connection, as one example. In some implementations, block 303 may not be performed. For example, block 303 may not be performed if a VPN is not being used by the source 102 (e.g., a client device). If the VPN is not being used by the source 102, then no additional encryption wrapping occurs until the message reaches the node 104A.

The wrapped and encrypted message can be transmitted to and received by the node 104A (the entry transit node) through the first secure connection in block 304. As described herein, the source 102 may only know a next hop destination in the transmittal chain for the message. In the example process 300, the next hop destination can be the node 104A. More particularly, and as described further in reference to at least FIG. 4, the next hop destination can be an ingress gateway of the node 104A.

Figure 7:
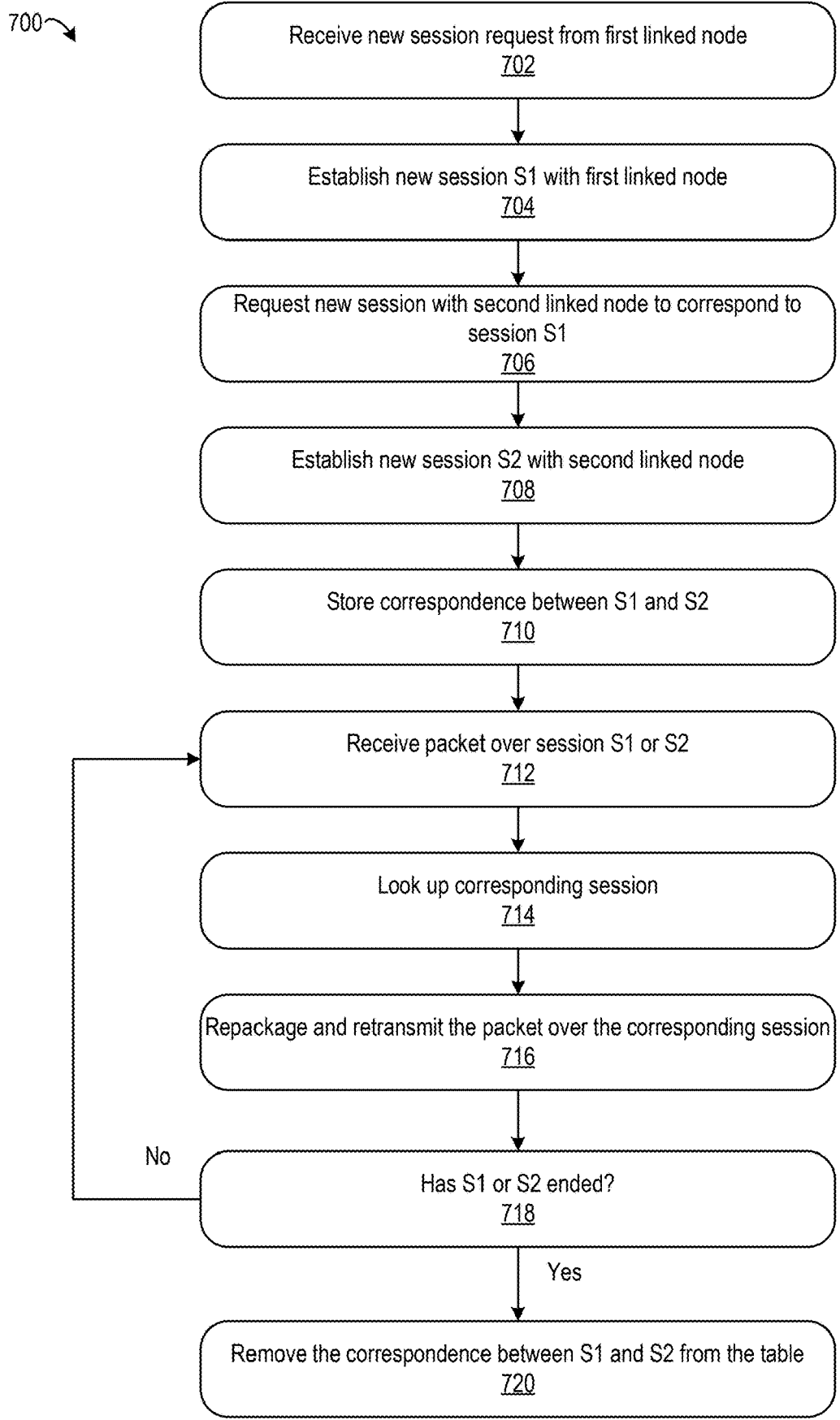
FIG. 7 is a flowchart of a process for establishing and validating a private session between endpoints, such as nodes.

In block 305, the node 104A can validate a session, or the first secure connection. The node 104A can validate a session between the source 102 and the node 104A. Sometimes, the node 104A can validate a session between the node 104A and a next hop destination, such as an egress gateway of the node 104A, the node 104N, and/or another component of the node 104N (e.g., an ingress gateway of the node 104N). Although not depicted, the source 102 can also validate the session between the source 102 and the node 104A (or the ingress gateway of the node 104A). The session can be validated by the source 102 at the same time as the node 104A validates the session in block 305. In some implementations, the source 102 may validate the session with the node 104A before transmitting the wrapped encrypted message via the first secure connection. Refer to FIG. 7 for further discussion about validating the session.

In block 306, the node 104A can determine whether one or more routing (e.g., transit) parameters are met. For example, the node 104A can apply one or more rules, parameters, and/or criteria to determine whether the received message should be transmitted through the chain to a subsequent node (where the node 104A only knows the next hop destination/the subsequent node). As described above, the routing parameters may include one or more of the following: the source IP, client authentication performed at the node 104A (e.g., at an ingress gateway of the node 104A) browser cookies, and/or URL(s) associated with the message. In some implementations, once the node 104A has determined that a specific session is related to secure transit of the message (e.g., authentication completed), the message can enter a designated tunnel that is passed on through the remaining nodes in the network without further authentication being required as long as the authentication of the node 104A was successful (e.g., the routing parameters were met and thus authentication was successful).

If the parameters are not met, the node 104A can transmit message failure information, which can be received by the source 102 in block 307. The process 300 may stop if the parameters are not met, which means the encrypted message may no longer be transmitted through the chain to the final destination 106. In some implementations the message may no longer be transmitted to a next hop destination in the chain if the message is corrupted, not permitted by Access Control Lists (ACLs) at an ingress gateway of the node 104A, and/or does not pass one or more authentication techniques performed at the node 104A.

If the routing parameters are met in block 306, the node 104A can wrap the encrypted message with another secure connection (block 308). The wrapped and encrypted message can be transmitted to and received by the node 104N through the other secure connection (block 318). The other secure connection can be unique and different from the first secure connection. As a result, only the receiving subsequent node or next hop destination (the node 104N) may be able to decrypt the wrapping from the other secure connection. Refer to at least block 304 for further discussion.

As described herein, the blocks 306 and 308 can be performed multiple times within the node 104A, by different components of the node 104A. The components can include an ingress gateway and an egress gateway. Each gateway can be programmed to perform blocks 306 and 308. A secure connection can be established between the ingress and egress gateways. Furthermore, the ingress gateway can be in secure connection with a previous hop destination (e.g., the source 102), the egress gateway can be in a second secure connection with a previous hop destination (e.g., the ingress gateway), and the egress gateway can also be in a third secure connection with a next hop destination (e.g., an ingress gateway of the next/subsequent node). Refer to at least FIG. 4 for further discussion.

Optionally, the node 104A may generate randomized network traffic in block 310. For example, the node 104A can generate traffic related to open-source software distribution. The node 104A can generate the traffic using a decoy server at the node 104A. Sometimes, an ingress gateway at the node 104A can generate the traffic. The randomized traffic generated in block 310 can be any type of traffic since it is not directly tied to the functionality of the disclosed secure transit network. Moreover, some decoy servers, such as online game servers, can be randomized based on unknown inputs created by online gaming activity. In some implementations, the randomized network traffic can be selected by a user at the source 102 or another relevant user (e.g., a user associated with the node 104A) deploying the disclosed secure transit network to better blend in with a location where the secure transit network is deployed. As an illustrative example, if the node 104A is located in a particular country, an online gaming system that is popular in that particular country can be selected and used for generating the randomized network traffic in block 310.

Block 310 can be performed before, during, or after any of the other blocks described in the process 300. Block 310 can be performed continuously, such that a constant stream of randomized network traffic is promulgated into the network to camouflage sensitive communications, such as the encrypted message passing through the chain to the destination 106. Sometimes, block 310 can be performed in response to a triggering event, such as a determination that the parameters are met in block 306. Refer to discussion of the honeypot 122A-N throughout this disclosure for more details.

The node 104A can optionally return the randomized network traffic as decoy traffic to obfuscate the wrapped and encrypted message as it is transmitted through the chain to the destination 106 (block 312). Returning the randomized traffic can include transmitting this traffic through the network or otherwise getting the traffic out into the network. This traffic can act as a decoy to the actual encrypted message being transmitted through the chain, thereby distracting potentially malicious actors from identifying and compromising the encrypted message or any of the server 102, the nodes 104A-N, and/or the destination 106.

Optionally, the node 104A may detect a potential breach in block 314. Because the node 104A is transmitting the random network traffic and distracting a malicious actor from the actual encrypted message, the node 104A can also act as a honeypot to attract the malicious actor. Hence, the node 104A can include the honeypot 122A described herein to perform blocks 310-316. The node 104A can apply one or more security rules, criteria, schemes, etc. to look for and detect potential breaches. If any of the rules, criteria, and/or scheme are triggered, the node 104A can identify a potential breach. Block 314 can be performed before, during, or after any of the other blocks described in the process 300.

Upon detecting the potential breach, the node 104A can optionally generate and return a notification of the potential breach in block 316. Sometimes, the node 104A may also execute one or more automated remedial actions to address the potential breach (e.g., blocking actions of the malicious actor). The chosen response of the node 104A may depend on the rules, criteria, and/or scheme that are applied and triggered. The response may also vary based on a severity of the potential breach or other information learned about the breach by the node 104A. The notification can be transmitted to and received by the source 102. Sometimes, the notification can be transmitted to and received by a third party system, which can provide security protections to the source 102, the network, the node 104A, etc. As described herein, the node 104A can include a server, such as a decoy server or a honeypot server, that can provide the breach/tamper detection techniques described above. If an adversary attempts to scan or penetrate the server, the server can then generate alerts or other notifications that indicate that an attempt to breach the node 104A was made.

Referring back to block 318, once the node 104N receives the wrapped and encrypted message from the node 104A, the node 104N can validate a session, or the other secure connection (block 319). The node 104N can validate a session between the node 104A and the node 104N (e.g., the egress gateway of the node 104A and an ingress gateway of the node 104N). Sometimes, the node 104N can validate a session between the node 104N and a next hop destination, such as an ingress gateway of another node in the secure transit network, the destination 106, or another component of the destination 106 (e.g., an ingress gateway of the destination 106). Although not depicted, the destination 106 can also validate the session between the node 104N and the destination 106. Refer to FIG. 7 for further discussion about validating the session.

Once the session, or the other secure connection, is validated and the node 104N has received the encrypted message via the other secure connection, the node 104N can determine whether routing parameters are met for the received message (block 320). Refer to block 306 for further discussion. The routing parameters can be different based on the next hop destination and/or from where the message originated.

If the parameters are not met, then the node 104N can transmit message failure information, which can be received by the source 102 in block 336. The process 300 may stop if the parameters are not met, which means the encrypted message may no longer be transmitted through the chain to the final destination 106. Refer to block 307 for further discussion.

If the routing parameters are met in block 320, the node 104N can wrap the encrypted message with an Nth secure connection (block 322). The Nth secure connection can be different from the first secure connection and the other secure connection. Refer to at least block 308 for further discussion.

The wrapped and encrypted message can be transmitted to and received by the destination 106 through the Nth secure connection (block 324). Refer to at least block 318 for further discussion. In some implementations, the wrapped and encrypted message can be transmitted to a next hop destination for which the Nth secure connection is established. The next hop destination can be the destination 106 but can also be any one or more other nodes in the network. In some implementations, a minimum of 3 hops may be required to fully obfuscate the network traffic transit. A number of hops can be increased based on user input and customization. For example, the number of hops can be increased if a user associated with the secure transit network (such as a user at the source 102) desires to have a greater amount of obfuscation. Sometimes, criteria can include a determination of how many internet service providers (ISPs) and/or nodes would an adversary need to breach in order to (i) collect enough connection information to determine that traffic is flowing between the nodes and (ii) identify the final destination.

The destination 106 can then decrypt the message using the private key or other encryption scheme shared between the source 102 and the destination 106 (block 326). Refer to FIGS. 1A, 2A, and 2B for further discussion.

Optionally, the node 104N may generate randomized network traffic in block 328. Block 328 can be performed before, during, or after any of the other blocks described in the process 300. Refer to at least block 310 for further discussion.

The node 104N can optionally return the randomized network traffic as decoy traffic to obfuscate the wrapped and encrypted message as it is transmitted through the chain to the destination 106 (block 330). Refer to at least block 312 for further discussion.

Optionally, the node 104N may detect a potential breach in block 332. Block 332 can be performed before, during, or after any of the other blocks described in the process 300. Refer to at least block 314 for further discussion.

Upon detecting the potential breach, the node 104N can optionally generate and return a notification of the potential breach in block 334. Sometimes, the node 104N may also execute one or more automated remedial actions to address the potential breach. Refer to at least block 316 for further discussion.

Figure 4:
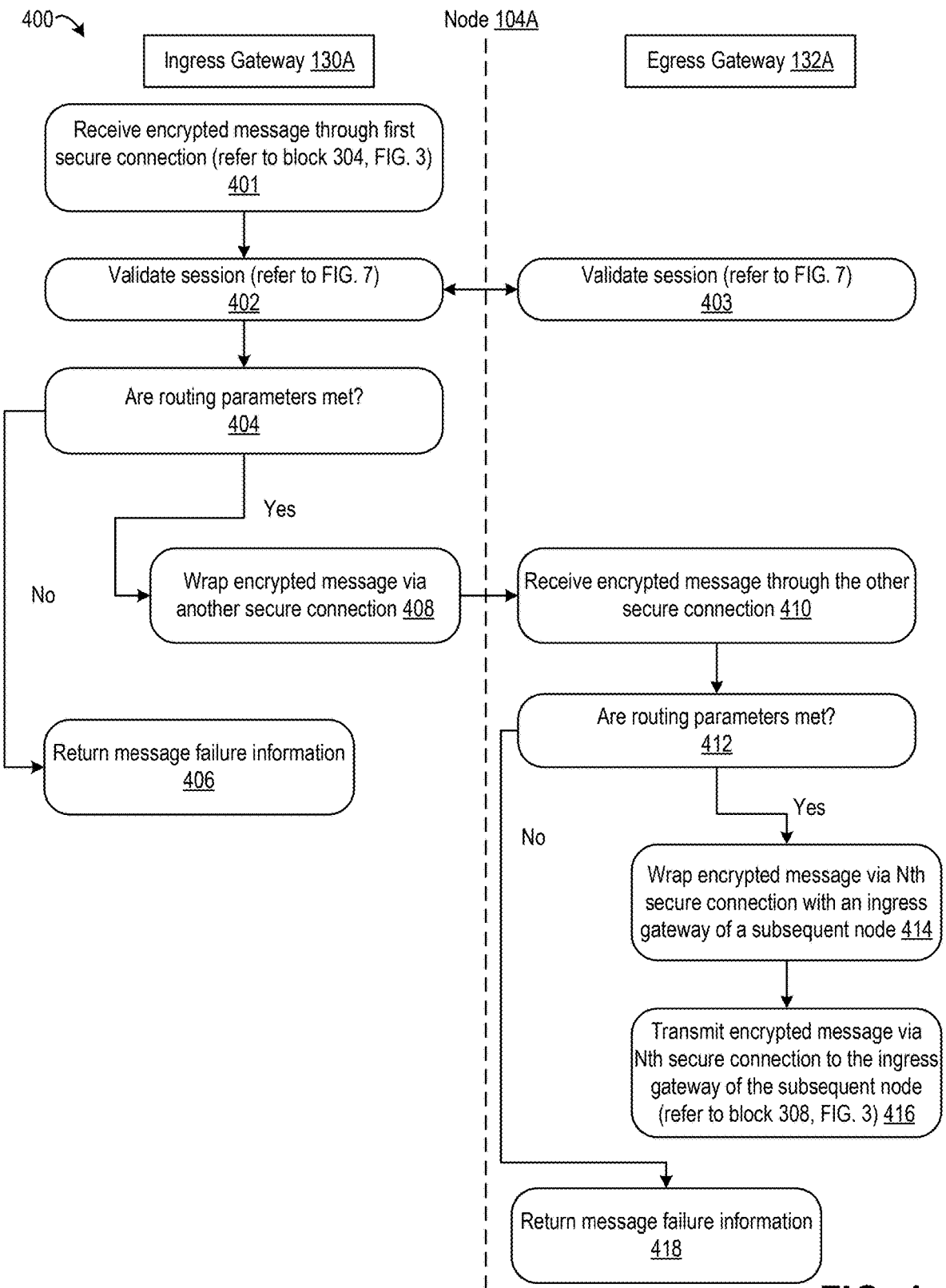
FIG. 4 is a swimlane diagram of a process for securely transmitting encrypted data through a node of a network described herein.

FIG. 4 is a swimlane diagram of a process 400 for securely transmitting encrypted data through a node of a network described herein. The process 400 can be performed with one or more components described herein. For example, the process 400 is described from the perspective of the ingress gateway 130A and the egress gateway 132A of the node 104A. The process 400 can also be performed using other components described throughout this disclosure or other similar components. Although the process 400 is described from the perspective of the node 104A, the process 400 can also be performed at the other nodes described herein.

Referring to the process 400, the ingress gateway 104A can receive an encrypted message through a first secure connection in block 401. The encrypted message can be wrapped via the first secure connection as an additional encryption layer. For example, the encrypted message can be part of a packet that is wrapped using the first secure connection. The message may be received from a previous hop destination. Sometimes, the previous hop destination can be the source 102. Sometimes, the previous hop destination can be an egress gateway of another node in the network. Refer to block 305 in FIG. 3 for further discussion about the message that is encrypted and then wrapped with the first secure connection. Sometimes, upon receiving the encrypted packet that has been wrapped using the first secure connection, the ingress gateway 104A can unwrap the packet. By unwrapping the packet, the ingress gateway 104A can determine whether the packet is intended to be transmitted to a next or subsequent hop destination. As described further in reference to FIG. 6B, for example, the ingress gateway 104A can determine whether there is an association between the first secure connection and another secure connection by using a correspondence lookup table. Based on identifying an association with another secure connection in the table, the ingress gateway 104A may then wrap the packet having the encrypted data using the associated other secure connection.

Figure 8:
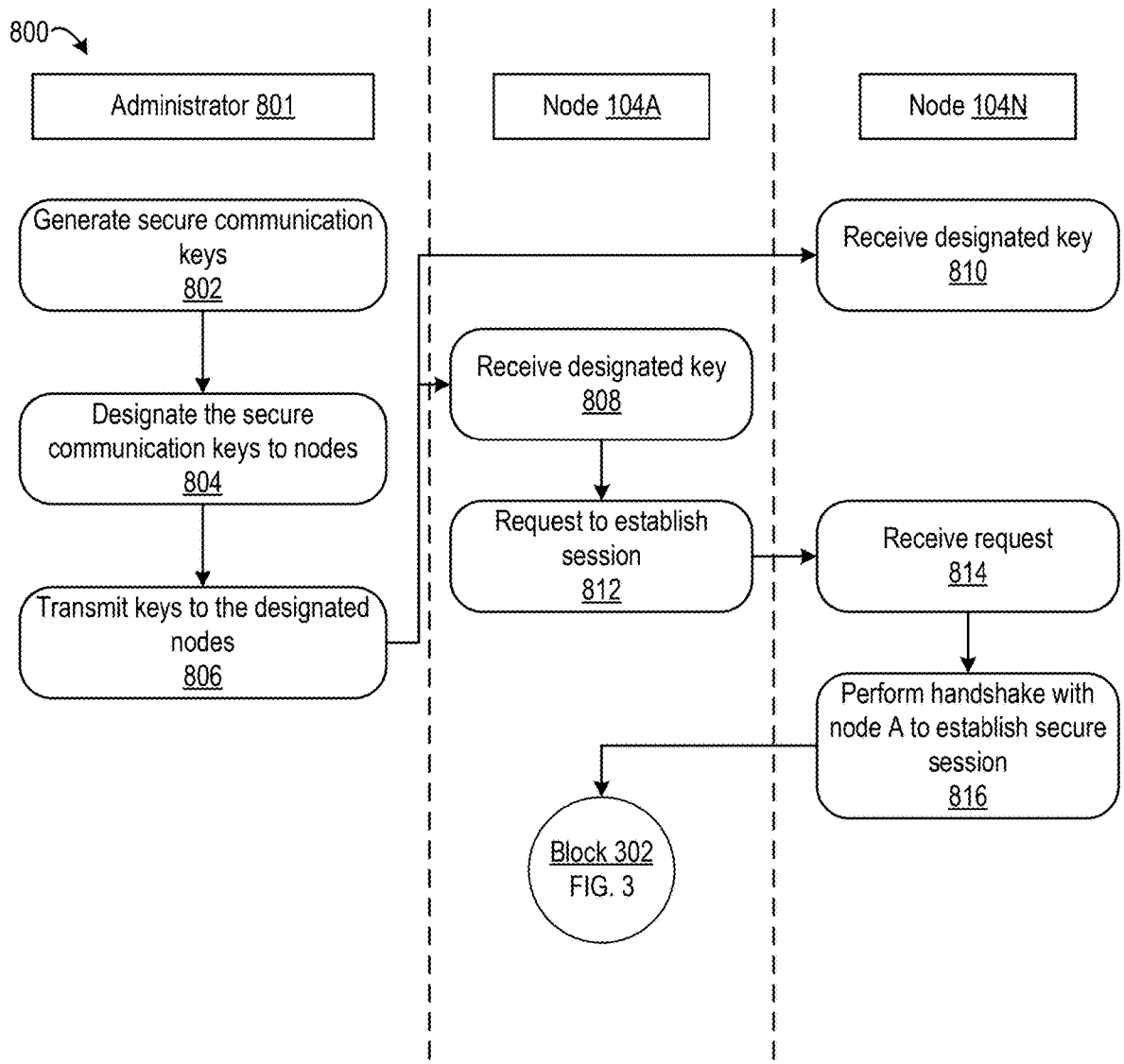
FIG. 8 is a swimlane diagram of a process for preconfiguring nodes in a secure transit network.

The ingress gateway 130A can validate a session in block 402. For example, the ingress gateway 130A may validate the first secure connection or session between the ingress gateway 130A and the previous hop destination. As another example, the ingress gateway 130A may validate a secure connection or session between the ingress gateway 130A and the egress gateway 132A of the node 104A. Refer to at least FIG. 7 for further discussion about validating the session. The ingress gateway 130A can be manually keys during a pre-configuration phase to know a next hop destination (in this example, the egress gateway 132A of the node 104A) and thus can create a secure connection or session with only that known next hop destination. Although automated instances of nodes, such as the node 104A, can be spun up in the secure transit network described herein, the node 104A can be manually configured and keyed to ensure that the key is not exposed and that the node 104A does not know any other nodes in the secure transit network. Refer to FIG. 8 for further discussion about preconfiguring the node 104A.

The egress gateway 132A may also validate a session in block 403. The egress gateway 132A may perform a handshake with the ingress gateway 130A to validate the session or secure connection between the ingress gateway 130A and the egress gateway 132A. In some implementations, the egress gateway 132A may validate a session or secure connection between the egress gateway 132A and a next hop destination, for which the egress gateway 132A is manually keyed. In such scenarios, the egress gateway 132A may validate the session in block 403 before, during, or after the ingress gateway 130A validates the session in block 402. For example, the egress gateway 132A may validate a next secure session or connection, such as with the next hop destination, after receiving the encrypted message from the ingress gateway 130A in block 410.

The ingress gateway 130A can then determine whether routing (e.g., transit) parameters are met for the received message in block 404. Refer to block 306 in FIG. 3 for further discussion.

If the parameters are not met, the ingress gateway 130A can return message failure information (block 406). The process 400 may stop so that the message is no longer routed through the network to a final destination. Refer to block 307 in FIG. 3 for further discussion.

If the parameters are met in block 404, the ingress gateway 130A can wrap the encrypted message via another secure connection (block 408). The other secure connection can be established between the ingress gateway 130A and the egress gateway 132A. Thus, the ingress gateway 130A may only know a next hop destination in the chain for the message, which is the egress gateway 132A of the node 104A. The other secure connection is unique and different from the first secure connection, or any other secure connections used in the network to transmit the message to the final destination. Refer to at least block 308 in FIG. 3 for further discussion.

The egress gateway 132A can receive the encrypted message through the other secure connection in block 410. Refer to block 402 in the process 400 for further discussion.

In block 412, the egress gateway 132A can determine whether the routing parameters are met for the received message. The routing parameters can be the same as or similar to parameters being checked at the ingress gateway 130A. In some implementations, however, an ingress gateway of a first node in the secure transit network may run additional authentication checks, which may not be performed at the egress gateway 132A or at other ingress or egress gateways of other nodes in the secure transit network. The additional checks run only at the first ingress gateway of the first node in the network can include checking the source IP address, client authentication, and/or browser cookie analysis. Refer to at least block 404 in the process 400 for further discussion.

If the parameters are not met, the egress gateway 132A can return message failure information (block 418). Refer to at least block 406 in the process 400 for further discussion.

If the parameters are met, the egress gateway 132A can wrap the encrypted message with an Nth secure connection with an ingress gateway of a subsequent node (e.g., a next hop destination) (block 414). Refer to block 408 in the process 400 and block 322 in FIG. 3 for further discussion.

The egress gateway 132A can then transmit the encrypted message via the Nth secure connection to the ingress gateway of the subsequent node. Refer, for example, to block 308 in FIG. 3 for further discussion.

Figure 5:
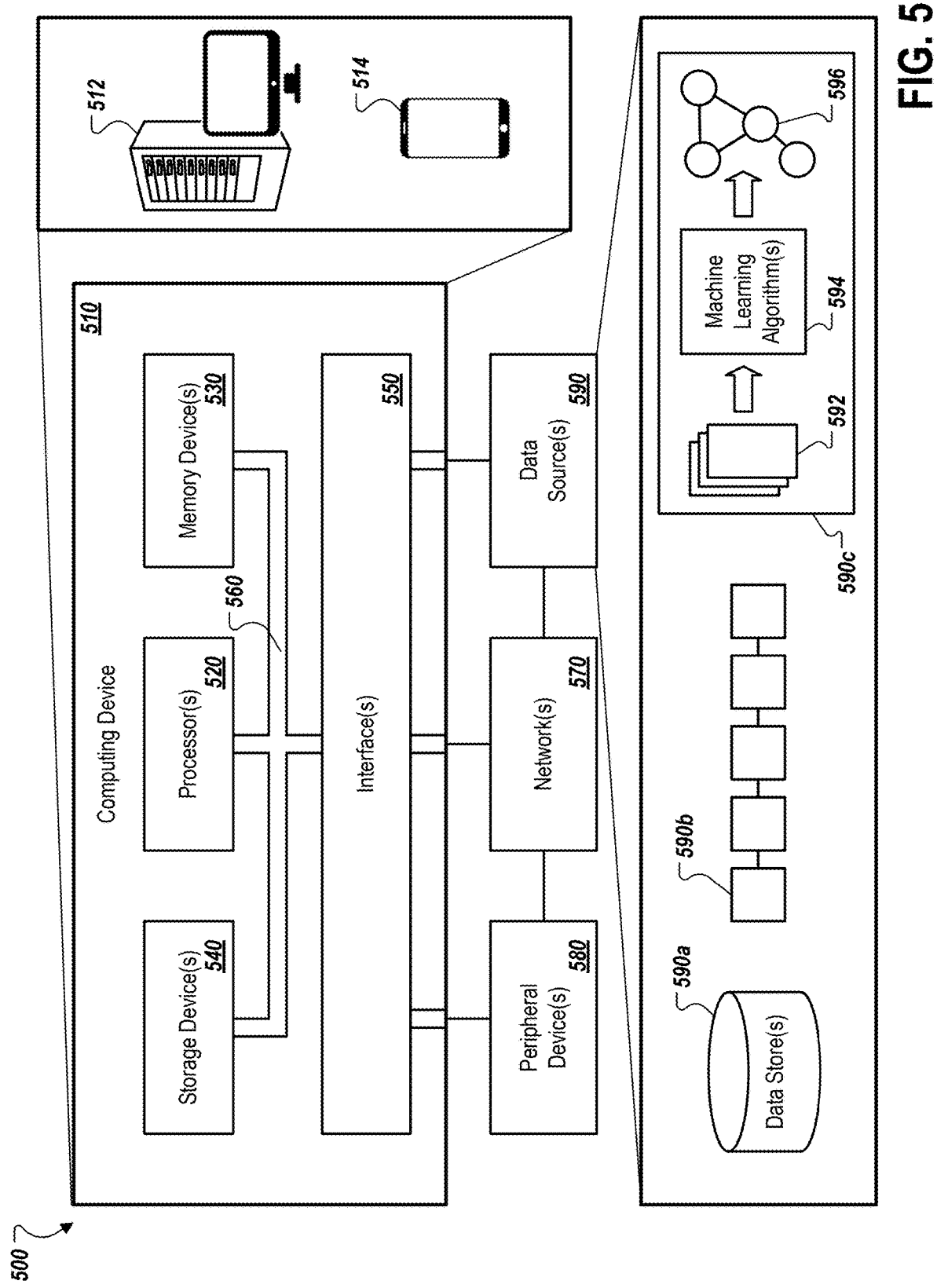
FIG. 5 is a schematic diagram that shows an example of a computing device and a mobile computing device.

FIG. 5 is a schematic diagram that shows an example of a computing system 500 that can be used to implement the techniques described herein. The computing system 500 includes one or more computing devices (e.g., computing device 510), which can be in wired and/or wireless communication with various peripheral device(s) 580, data source(s) 590, and/or other computing devices (e.g., over network(s) 570). The computing device 510 can represent various forms of stationary computers 512 (e.g., workstations, kiosks, servers, mainframes, edge computing devices, quantum computers, etc.) and mobile computers 514 (e.g., laptops, tablets, mobile phones, personal digital assistants, wearable devices, etc.). In some implementations, the computing device 510 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 510, and an entire system can be made up of multiple devices communicating with each other. For example, the computing device 510 can be part of a computing system that includes a network of computing devices, such as a cloud-based computing system, a computing system in an internal network, or a computing system in another sort of shared network. Processors of the computing device (510) and other computing devices of a computing system can be optimized for different types of operations, secure computing tasks, etc. The components shown herein, and their functions, are meant to be examples, and are not meant to limit implementations of the technology described and/or claimed in this document.

The computing device 510 includes processor(s) 520, memory device(s) 530, storage device(s) 540, and interface(s) 550. Each of the processor(s) 520, the memory device(s) 530, the storage device(s) 540, and the interface(s) 550 are interconnected using a system bus 560. The processor(s) 520 are capable of processing instructions for execution within the computing device 510, and can include one or more single-threaded and/or multi-threaded processors. The processor(s) 520 are capable of processing instructions stored in the memory device(s) 530 and/or on the storage device(s) 540. The memory device(s) 530 can store data within the computing device 510, and can include one or more computer-readable media, volatile memory units, and/or non-volatile memory units. The storage device(s) 540 can provide mass storage for the computing device 510, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 550 can include various communications interfaces (e.g., USB, Near-Field Communication (NFC), Bluetooth, WiFi, Ethernet, wireless Ethernet, etc.) that can be coupled to the network(s) 570, peripheral device(s) 580, and/or data source(s) 590 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 550 can include a control interface that receives commands from an input device (e.g., operated by a user) and converts the commands for submission to the processors 520. The interface(s) 550 can include a display interface that includes circuitry for driving a display to present visual information to a user. The interface(s) 550 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 570 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 510 can communicate with the peripheral device(s) 580, the data source(s) 590, and/or other computing devices over the network(s) 570. In some implementations, the computing device 510 can directly communicate with the peripheral device(s) 580, the data source(s), and/or other computing devices.

The peripheral device(s) 580 can provide input/output operations for the computing device 510. Input devices (e.g., keyboards, pointing devices, touchscreens, microphones, cameras, scanners, sensors, etc.) can provide input to the computing device 510 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 510 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 590 can provide data for use by the computing device 510, and/or can maintain data that has been generated by the computing device 510 and/or other devices (e.g., data collected from sensor devices, data aggregated from various different data repositories, etc.). In some implementations, one or more data sources can be hosted by the computing device 510 (e.g., using the storage device(s) 540). In some implementations, one or more data sources can be hosted by a different computing device. Data can be provided by the data source(s) 590 in response to a request for data from the computing device 510 and/or can be provided without such a request. For example, a pull technology can be used in which the provision of data is driven by device requests, and/or a push technology can be used in which the provision of data occurs as the data becomes available (e.g., real-time data streaming and/or notifications). Various sorts of data sources can be used to implement the techniques described herein, alone or in combination.

In some implementations, a data source can include one or more data store(s) 590*a*. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database(s), for example, can include relational databases, object databases, structured document databases, unstructured document databases, graph databases, and other appropriate types of databases.

In some implementations, a data source can include one or more blockchains 590*b*. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 590*c*. The machine learning system(s) 590*c*, for example, can be used to analyze data from various sources (e.g., data provided by the computing device 510, data from the data store(s) 590*a*, data from the blockchain(s) 590*b*, and/or data from other data sources), to identify patterns in the data, and to draw inferences from the data patterns. In general, training data 592 can be provided to one or more machine learning algorithms 594, and the machine learning algorithm(s) can generate a machine learning model 596. Execution of the machine learning algorithm(s) can be performed by the computing device 510, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer- or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

Figure 6A:
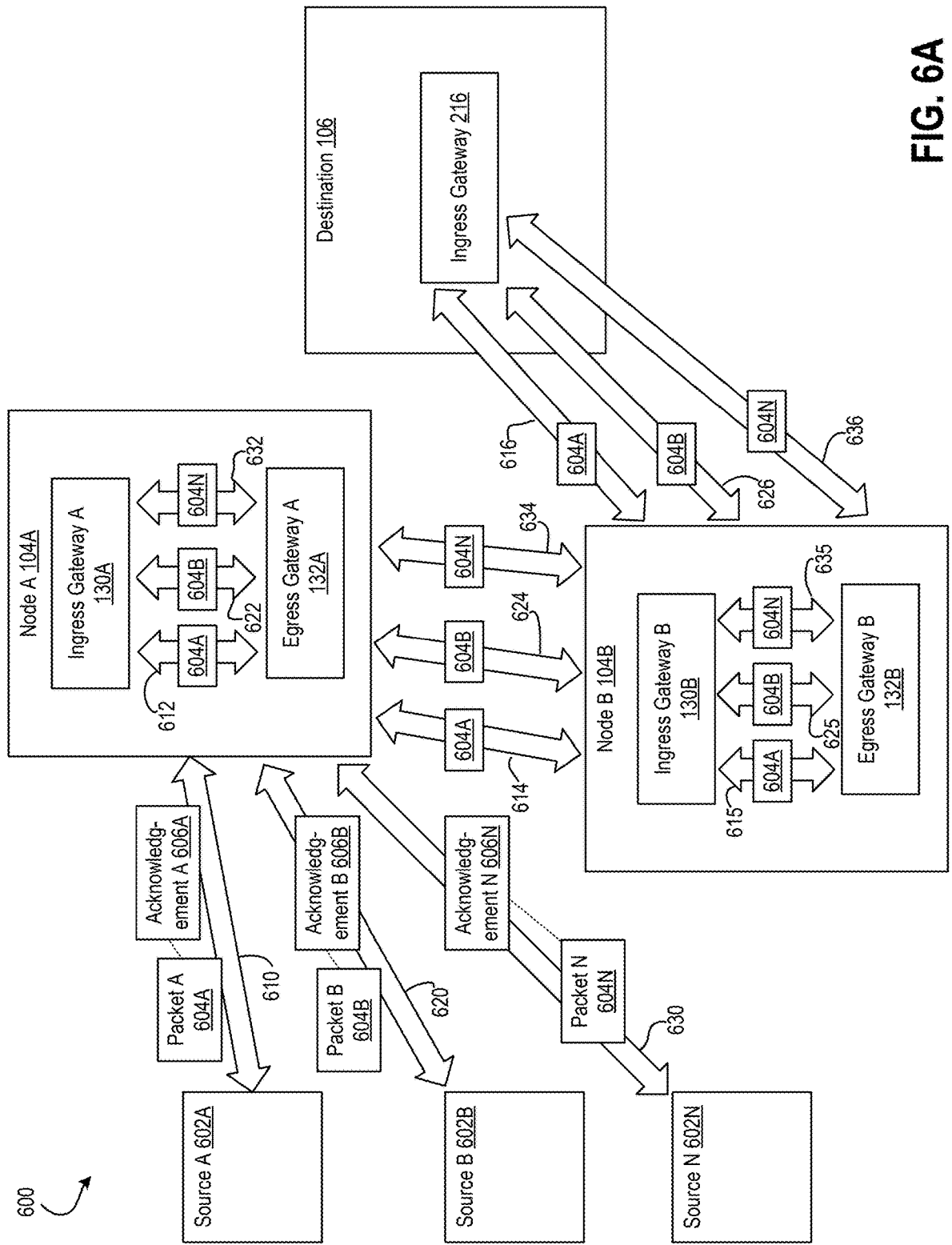
FIG. 6A is a conceptual diagram of a network for securely transmitting encrypted data across separate secure sessions that are established in the network for different sources.

FIG. 6A is a conceptual diagram of a network 600 for securely transmitting encrypted data across separate secure sessions that are established in the network 600 for different sources A (602A), B (602B), and N (602N). The sources A (602A), B (602B), and N (602N) can be similar to or the same as the source 102 described herein. As shown in FIG. 6A, sessions 610, 612, 514, 615, 616, 620, 622, 624, 625, 626, 630, 632, 634, 635, and 636 can be established in the network 600. Each of the sessions 610, 612, 514, 615, 616, 620, 622, 624, 625, 626, 630, 632, 634, 635, and 636 can be a secure private communication session. Each of the sessions 610, 612, 514, 615, 616, 620, 622, 624, 625, 626, 630, 632, 634, 635, and 636 can be a separate session. Some of the sessions 610, 612, 514, 615, 616, 620, 622, 624, 625, 626, 630, 632, 634, 635, and 636 can be associated with the source A (602A), some can be associated with source B (602B), and some can be associated with source N (602N).

For example, the sessions 610, 612, 614, 615 and 616 can be associated with the source A (602A). The session 610 can be established between the source A (602A) and the ingress gateway A (130A) of the node A (104A). Once the source A (602A) establishes the relevant and authenticated session 610, a transit chain can be completed, thereby allowing the chain to be used in circumstances where packages may need to be retransmitted (e.g., due to loss of IP address or transient error). The session 612 can be established between the ingress gateway A (130A) and the egress gateway A (132A) of the node A (104A). The session 614 can be established between the egress gateway A (132A) of the node A (104A) and the ingress gateway B (130B) of the node B (104B). The session 615 can be established between the ingress gateway B (130B) and the egress gateway B (132B) of the node B (104B). The session 616 can be established between the egress gateway B (132B) of the node B (104B) and the ingress gateway 216 of the destination 106. Along the sessions 610, 612, 614, 615, and 616, packet A traffic (604A) originating from the source A (602A) can be transmitted using the disclosed techniques to a next destination hop. Each node in the network 600 can be authenticated before the packet A (604A) is transmitted to the next destination hop, as described further in reference to FIG. 7. Acknowledgement A traffic (606A) can also be transmitted (e.g., back to a previous destination hop) to indicate that the packet A traffic (604A) was successfully received at the next hop destination. In some implementations, the acknowledgement A (606A) can be part of the packet A traffic (604A) being transmitted to the next destination hop. The acknowledgement A (606A) can, in some implementations, be received as part of a payload of the packet A (604A). As the packet A traffic (604A) is transmitted through the network 600, contents of the packet may remain the same, but the acknowledgement A (606A) can be updated or otherwise changed to reflect the previous destination hop and an acknowledgement or indication that the packet A (604A) was successfully transmitted. Although not depicted, the acknowledgement A (606A) can also be transmitted/received over the sessions 612, 614, 615, and 616. the Refer to FIG. 6B for further discussion about packet and acknowledgement transmission.

The sessions 620, 622, 624, 625, and 626 can be associated with the source B (602B). The session 620 can be established between the source B (602B) and the ingress gateway A (130A) of the node A (104A). The session 622 can be established between the ingress gateway A (130A) and the egress gateway A (132A) of the node A (104A). The session 624 can be established between the egress gateway A (132A) of the node A (104A) and the ingress gateway B (130B) of the node B (104B). The session 625 can be established between the ingress gateway B (130B) and the egress gateway B (132B) of the node B (104B). The session 626 can be established between the egress gateway B (132B) of the node B (104B) and the ingress gateway 216 of the destination 106. Along the sessions 620, 622, 624, 625, and 626, packet B traffic (604B) originating from the source B (602B) can be transmitted using the disclosed techniques to a next destination hop. Acknowledgement B traffic (606B) can also be transmitted (e.g., back to a previous destination hop) to indicate that the packet B traffic (604B) was successfully received at the next destination hop. In some implementations, the acknowledgement B (606B) can be part of the packet B traffic (604B) being transmitted to the next destination hop. The acknowledgement B (606B) can, in some implementations, be received as part of a payload of the packet B (604B). As the packet B traffic (604B) is transmitted through the network 600, contents of the packet may remain the same, but the acknowledgement B (606B) can be updated or otherwise changed to reflect the previous destination hop and an acknowledgement or indication that the packet B (604B) was successfully transmitted. Although not depicted, the acknowledgement B (606B) can also be transmitted/received over the sessions 622, 624, 625, and 626. the Refer to FIG. 6B for further discussion about packet and acknowledgement transmission.

The sessions 630, 632, 634, 635, and 636 can be associated with the source N (602N). The session 630 can be established between the source N (602N) and the ingress gateway A (130A) of the node A (104A). The session 632 can be established between the ingress gateway A (130A) and the egress gateway A (132A) of the node A (104A). The session 634 can be established between the egress gateway A (132A) of the node A (104A) and the ingress gateway B (130B) of the node B (104B). The session 635 can be established between the ingress gateway B (130B) and the egress gateway B (132B) of the node B (104B). The session 636 can be established between the egress gateway B (132B) of the node B (104B) and the ingress gateway 216 of the destination 106. Along the sessions 630, 632, 634, 635, and 636, packet N traffic (604N) originating from the source N (602N) can be transmitted using the disclosed techniques to a next destination hop. Acknowledgement N traffic (606N) can also be transmitted (e.g., back to a previous destination hop) to indicate that the packet N traffic (604N) was successfully received at the next destination hop. In some implementations, the acknowledgement N (606N) can be part of the packet N traffic (604N) being transmitted to the next destination hop. The acknowledgement N (606N) can, in some implementations, be received as part of a payload of the packet N (604N). As the packet N traffic (604N) is transmitted through the network 600, contents of the packet may remain the same, but the acknowledgement N (606N) can be updated or otherwise changed to reflect the previous destination hop and an acknowledgement or indication that the packet N (604N) was successfully transmitted. Although not depicted, the acknowledgement N (606N) can also be transmitted/received over the sessions 632, 634, 635, and 636. the Refer to FIG. 6B for further discussion about packet and acknowledgement transmission.

FIG. 6B is a conceptual diagram of packet and acknowledgement transmission in private sessions of the network 600. FIG. 6B provides an illustrative example of the data transmission between the source A (602A) and the destination 106 via the private and secure sessions 610, 614, and 616. Although not depicted, similar transmission occurs between ingress and egress gateways of at least the node A (104A) and the node B (104B). Refer to FIG. 6A for further discussion about the transmissions between gateways.

The source A (602A) can transmit the packet 108 across the session 610 to the node A (104A) (block A). The packet 108 can include information such as the source, the destination, and a synchronize (SYN) value A. The SYN A, or other similar values, can be used to initiate a connection/session and synchronize sequence numbers between the source A (602A) and the node A (104A). The packet 108 can also include the secure encryption wrapper B (112), described herein. The payload 114 can be wrapped in the wrapper B (112) and can include a private SYN value B and the encrypted message A (116).

The SYN value B can be persistent in the payload 114 (e.g., SYN-XYZ) whereas the SYN value A can change as the packet 108 moves throughout the network 600 along the sessions 610, 614, and 616. The payload 114's SYN value B can be an encrypted and broader sequence number of the brute force level communication that remains the same across the network 600. During the session 610 between the source A (602A) and the node A (104A), the SYN value A in the packet 108 is 1234 (block A). During the session 614 between the node A (104A) and the node B (104B), the SYN value A in the packet 108 is 3456 (block C). During the session 616 between the node B (104B) and the destination 106, the SYN value A in the packet is 5678 (block E).

Along each of the sessions 610, 614, and 616, a respective acknowledgement 654 (block B), 656 (block D), and 658 (block F) can be transmitted. The acknowledgements 654 (block B), 656 (block D), and 658 (block F) can indicate that the packet 108 has been successfully transmitted between corresponding nodes (e.g., the source A (602A) and the node A (104A) over the session 610, the node A (104A) and the node B (104B) over the session 614, and the node B (104B) and the destination 106 over the session 616).

The acknowledgment 654 (block B) can be transmitted from the node A (104A) to the source A (602A) in response to the node A (104A) successfully receiving the packet 108 (block A) over the session 610. The acknowledgment 654 (block B) can include the source, the destination, and an acknowledgement (ACK) value. Here, the ACK value in the acknowledgement 654 (block B) can correspond to the SYN value A in the packet 108 (block A) transmitted over the session 610 by the source A (602A). Thus, the ACK value of 1234 in the acknowledgement 654 (block B) indicates that the packet 108 (block A) was successfully transmitted from the source A (602A) having the SYN A value 1234.

The acknowledgment 656 (block D) can be transmitted from the node B (104B) to the node A (104A) in response to the node B (104B) successfully receiving the packet 108 (block C) over the session 614. The acknowledgment 656 (block D) can include the source, the destination, and an ACK value. Here, the ACK value in the acknowledgement 656 (block D) can correspond to the SYN value A in the packet 108 (block C) transmitted over the session 614 by the node A (104A). Thus, the ACK value of 3456 in the acknowledgement 656 (block D) indicates that the packet 108 (block C) was successfully transmitted from the node A (104A) having the SYN A value 3456.

The acknowledgment 658 (block F) can be transmitted from the node B (104B) to the destination 106 in response to the destination 106 successfully receiving the packet 108 (block E) over the session 616. The acknowledgment 658 (block F) can include the source, the destination, and an ACK value. Here, the ACK value in the acknowledgement 658 (block F) can correspond to the SYN value A in the packet 108 (block E) transmitted over the session 616 by the node B (104B). Thus, the ACK value of 5678 in the acknowledgement 658 (block F) indicates that the packet 108 (block E) was successfully transmitted from the node B (104B) having the SYN A value 5678.

Still referring to FIG. 6B, the node A (104A) can maintain a session correspondence table A (650). Although not depicted, an ingress gateway of the node A (104A) can maintain the session correspondence table A (650). The session correspondence table A (650) be used to maintain and associate private sessions, such as sessions between the node A (104A) and a previous destination hop and/or a next destination hop. The session correspondence table A (650) of the node A (104A) can, for example, maintain an association between the session 610 and the session 614. The session correspondence table A (650) may also maintain other associations between other sessions that are associated with the same source A (602A) and/or other sources, such as the sources described in reference to FIG. 6A. The associations maintained in the session correspondence table A (650) may also be updated over time, such as based on a determination that a session has in fact expired, ended, or otherwise been terminated. Refer to FIG. 7 for further discussion.

As described in reference to FIG. 7, the node 104A can look up an association between sessions in the network 600 using the session correspondence table A (650) to identify the session to use to send the packet 108 along to the next destination hop. For example, the node A (104A) can receive the packet 108 (block A) over the session 610. The node A (104A) can check whether the session 610 is one of the correspondent sessions in the session correspondence table A (650). If the session 610 is in the table A (650), the node A (104A) can then identify, from the table A (650) the corresponding session for the session 610. In the example of FIG. 6B, the corresponding session for the session 610 is the session 614. Accordingly, the node A (104A) can transmit the packet 108 (block C) over the session 614 to the next destination hop (the node B, 104B). As described herein, the node A (104A) may also have sessions established between a plurality of different nodes and sources in the network 600, all of which may be recorded, accessed, maintained, updated, and/or removed in the session correspondence table A (650). In some implementations, the acknowledgement 654 (block B) and/or 656 (block D) can be transmitted across the respective session 610 or 614 and then used to route the packet 108 over the next session to the next destination hop.

Similar to the node A (104A), the node B (104B) can maintain a session correspondence table B (652). Although not depicted, an ingress gateway of the node B (104B) can maintain the session correspondence table B (652). The session correspondence table B (652) be used to maintain and associate private sessions, such as sessions between the node B (104B) and a previous destination hop and/or a next destination hop. The session correspondence table B (652) can, for example, maintain an association between the session 614 and the session 616. The session correspondence table B (652) may also maintain other associations between other sessions that are associated with the same source A (602A) and/or other sources, such as the sources described in reference to FIG. 6A. The associations maintained in the session correspondence table B (652) may be updated over time, such as based on a determination that a session has in fact expired, ended, or otherwise been terminated.

As described in reference to FIG. 7, the node 104B can look up an association between sessions in the network 600 using the session correspondence table B (652) to identify the session to use to send the packet 108 along to the next destination hop. For example, the node B (104B) can receive the packet 108 (block C) over the session 614. The node B (104B) can check whether the session 614 is one of the correspondent sessions in the session correspondence table B (652). If the session 614 is in the table B (652), the node B (104B) can then identify, from the table B (652) the corresponding session for the session 614. In the example of FIG. 6B, the corresponding session for the session 614 is the session 616. Accordingly, the node B (104B) can transmit the packet 108 (block E) over the session 616 to the next destination hop (the destination 106). As described herein, the node B (104B) may also have sessions established between a plurality of different nodes and sources in the network 600, all of which may be recorded, accessed, maintained, updated, and/or removed in the session correspondence table B (652). In some implementations, the acknowledgement 656 (block D) and/or 658 (block F) can be transmitted across the respective session 614 or 616 and then used to route the packet 108 over the next session to the next destination hop.

FIG. 7 is a flowchart of a process 700 for establishing and validating a private session between endpoints, such as nodes. The process 700 can be performed by any component of a secure transit network described herein. For example, the process 700 can be performed by a source having a packet to be transmitted across the network. The process 700 can be performed by any node(s) in the secure transit network that is configured to transmit the packet securely to a final destination. The process 700 can be performed by a destination server. For illustrative purposes, the process 700 is described from the perspective of an endpoint, which can correspond to any of the sources, client devices, nodes, and/or destination servers described herein.

Referring to the process 700 in FIG. 7, the endpoint can receive a new session request from a first linked node (block 702). The request can be made to establish a new, private, secure connection between the endpoint and the first linked node. As described herein, this new session is separate from any other session that may be established in the secure transit network. Here, as a merely illustrative example, the first linked node can be a source and the endpoint can be a first node in the secure transit network.

The endpoint can establish a new session S1 with the first linked node in block 704. The session S1 can be established using any of the techniques described herein.

In block 706, the endpoint can request a new session with a second linked node to correspond to the session S1. The endpoint may be manually keyed such that it knows only the second linked node (e.g., a next destination hop) but no other nodes or hops in the secure transit network. Using the key, the endpoint can request the new session with the second linked node.

The endpoint can accordingly establish a new session S2 with the second linked node (block 708). The session S2 can be established using any of the techniques described herein.

The endpoint can store information about a correspondence between the sessions S1 and S2 (block 710). As described in reference to at least FIG. 6B, the correspondence information can be stored in a table at the endpoint. The table can indicate which sessions correspond to each other. Sometimes, as described in reference to FIG. 6B, the session correspondence can be determined based on information received in the packet (e.g., SYN values, source information, destination information) and/or acknowledgement(s) (e.g., ACK value, source information, destination information).

Once the sessions S1 and S2 have been established, the endpoint can receive, in block 712, a packet over the session S1 or S2. The endpoint can receive and transmit data in either direction over either session S1 or S2. The packet can include a secure encrypted message to be transmitted from a source to a final destination over the transit network. In some implementations, the packet can include an acknowledgement packet, indicating that the packet having the secure encrypted message was successfully transmitted to and received at the next destination hop.

In block 714, upon receiving the packet, the endpoint can look up a corresponding session. As described in reference to FIG. 6B, the received packet can include information such as the source, the destination, and/or the SYN value. Any of this information, and/or session-based information, can be used by the endpoint to identify a session that corresponds to the session over which the packet was received. The endpoint can search the table for correspondence information between the session over which the packet was received and a next session (where the next session connects the endpoint to the next destination hop).

The endpoint can then repackage and transmit the packet over the corresponding session in block 716. Refer to at least FIGS. 3 and 4 for further discussion about repackaging and transmitting the packet over the corresponding session.

The endpoint can determine whether either session S1 or S2 has ended in block 718. For example, the endpoint can determine whether either session S1 or S2 has timed out. As another example, the endpoint can determine whether either session S1 or S2 has been affirmatively ended according to one or more termination criteria (e.g., the packet has reached its final destination, the source closed the session or indicated that it has no more packets/data to transfer).

If either session S1 or S2 has ended, the endpoint can remove the correspondence between the sessions S1 and S2 in block 720. In other words, the endpoint can remove the correspondence information between the sessions S1 and S2 from the table. Removing the correspondence information can ensure that the transit network remains secure. When sessions are no longer being used, their correspondence can be removed from the table to prevent a potentially malicious actor from infiltrating the endpoint and uncovering the session correspondence, and thus compromising the network.

After performing block 720, the process 700 may stop. Alternatively, the endpoint can return to block 702 in the process 700 and receive a new session request for another linked node. The endpoint may continue through the process 700 to establish the connection with the other linked node. In some implementations, the process 700 can be performed many times to establish many different connections with many different linked nodes. The process 700 can be performed simultaneously or in parallel to establish the many connections with the many nodes.

Referring back to block 718, if neither session S1 nor S2 ended, then the endpoint can return to block 712 and receive a packet over either session S1 or S2. In other words, the endpoint can continue performing the process 700 and receiving packets over the sessions S1 and/or S2 until either session S1 or S2 has ended.

FIG. 8 is a swimlane diagram of a process 800 for preconfiguring nodes in a secure transit network. The process 800 can be performed before data packets are transmitted over the secure transit network using the disclosed techniques. The process 800 can be performed by one or more components in the secure transit network, such as an administrator 801 and the nodes 104A-N. The administrator 801 can be any type of computing device, computing system, network of computing devices/systems, node, and/or endpoint in the secure transit network. In some implementations, the administrator 801 may be a source. Sometimes, the administrator 801 may be one of the nodes 104A-N. In yet some implementations, the administrator 801 may include a destination.

Referring to the process 800 in FIG. 8, the administrator 801 can generate secure communication keys in block 802. In some implementations, the keys can be generated by a server, such as the administrator 801, during initialization. Sometimes, the keys can be imported to the nodes 104A-N after being generated offline, optionally using hardware randomization techniques. The keys can be statically generated. The administrator 801 may generate keys and then rotate through the keys at predetermined time intervals or based on satisfaction of one or more key rotation criteria. In some implementations, the process 800 can include in-flight key rotation.

The administrator 801 can designate the secure communication keys to the nodes 104A-N (block 804). In some implementations, the keys can be randomly designated to the nodes 104A-N. If there is metadata visible without decryption, then the metadata, such as issuer information, can be generated to match a decoy server's purpose (e.g., an online game server name). Keys can be designated using known techniques, so long as the keys are not reused in any other part of the transit chain. If the type of key used has any metadata that may be viewed without decryption, the metadata may be specifically set to aid camouflaging the traffic. As an illustrative example, if the key has visible metadata (e.g., non-encrypted metadata) showing a certificate authority (CA) that issued the key, then the CA name can be selected to match the name of a decoy server function.

In block 806, the administrator 801 can transmit the keys to the designated nodes 104A-N. The node 104A can receive the designated key (block 808) and the node 104N can receive the designated key (block 810).

Although the nodes 104A-N may be automated, set up/configured with automation techniques, and/or spun out using automation, the nodes 104A-N can be manually keyed. Manually keying the nodes 104A-N can ensure that there is no opportunity for the respective key to be disclosed by an automation process at the time that each of the nodes 104A-N is being spun up. Thus, each of the nodes 104A-N can be manually keyed, where each key indicates a next destination hop from the node that is designated the key. For example, the key designated to the node 104A may only allow the node 104A to interact with a previous node (e.g., a source) and a next destination hop (e.g., a node 104B). The key designated to the node 104N may only allow the node 104N to interact with a previous node (e.g., the node 104B) and the next destination hop (e.g., a destination).

The node 104A can then request to establish a session with the node 104N in block 812. Various protocol can be used for securing communication between the nodes 104A-N. For example, a handshake process can be performed where the nodes 104A-N exchange their keys, authenticate each other, and agree on encryption methods. The keys can be used to create the secure session. Sometimes, a Transport Layer Security (TLS) protocol can be used to establish the secure session. Once a TLS handshake is complete, for example, a symmetric session key can be established for secure communication between the nodes 104A and 104N. As another example, Secure Shell (SSH) techniques can be used. During a SSH handshake, public keys can be exchanged between the nodes 104A and 104N and a symmetric session key can be established for the secure session.

Accordingly, the node 104N can receive the request in block 814.

The node 104N can then perform a handshake with the node 104A to establish a secure session between the two (block 816). Refer to block 812 for further discussion about the handshake.

Once the secure session is established, the node 104A can proceed to perform block 302 in the process 300 of FIG. 3. In other words, the node 104A can now receive a packet having an encrypted message and perform the described techniques to securely transmit the packet to a next destination hop, such as the node 104N.

In some implementations, establishing a session between a source and a first node can cause cascading sessions to be establishes across all nodes in the secure transit network.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for transmitting encrypted data over a network, the system comprising:
   a network node comprising an ingress gateway and an egress gateway,
   wherein the ingress gateway comprises a processor and memory configured to store instructions that, when executed by the processor, cause the ingress gateway to:
      receive a packet over a first secure connection;
      evaluate the packet and its contents;
      based on the evaluation, identify a corresponding second secure connection with the egress gateway; and
      transmit the packet over the corresponding second secure connection to the egress gateway,
   wherein the egress gateway comprises a processor and memory configured to store instructions that, when executed by the processor, cause the egress gateway to:
      receive the packet over the corresponding second secure connection;
      evaluate the packet and its contents;
      based on the evaluation, identify a corresponding third secure connection with an ingress gateway of a subsequent network node; and
      transmit the packet over the corresponding third secure connection to the ingress gateway of the subsequent network node.

2. The system of claim 1, wherein the network node further comprises a honeypot server configured to generate decoy traffic and return the decoy traffic into the network to obfuscate the data that is transmitted through the network.

3. The system of claim 1, wherein based on the evaluation, the ingress gateway is further configured to (i) unwrap the packet and (ii) wrap the packet using the corresponding second secure connection.

4. The system of claim 1, wherein the packet received over the first secure connection identifies the ingress gateway of the network node as a destination, and wherein wrapping the packet using the corresponding second secure connection comprises re-designating the destination in the packet as the egress gateway of the network node.

5. The system of claim 1, wherein based on the evaluation, the egress gateway is further configured to (i) unwrap the packet and (ii) wrap the packet using the corresponding third secure connection.

6. The system of claim 1, wherein the first secure connection, the corresponding second secure connection, and the corresponding third secure connection are different from each other.

7. The system of claim 1, wherein the ingress gateway is further configured to: generate decoy traffic and return the decoy traffic into the network to obfuscate the data that is transmitted through the network.

8. The system of claim 1, wherein the first secure connection, the corresponding second secure connection, and the corresponding third secure connection are (i) different from each other and (ii) each established in association with a source of the packet.

9. The system of claim 1, wherein the ingress gateway is further configured to perform a first layer of network address translation techniques (natting) and the egress gateway is further configured to perform a second layer of natting.

10. The system of claim 1, wherein the ingress gateway is further configured to perform a client authentication mechanism based on receiving the packet over the first secure connection.

11. The system of claim 1, wherein the egress gateway is configured to:
    pad the packet; and
    transmit the padded packet over the corresponding third secure connection to the ingress gateway of the subsequent network node.

12. The system of claim 11, wherein an amount of the padding is determined based on session parameters.

13. The system of claim 12, wherein the egress gateway is further configured to communicate the amount of padding to the ingress gateway of the subsequent network node using the corresponding third secure connection.

14. The system of claim 1, wherein the system comprises:
    a first plurality of network nodes in a first zone and a second plurality of network nodes in a second zone; and
    a load balancer that is configured to route traffic amongst the first plurality of network nodes in the first zone and the second plurality of network nodes in the second zone.

15. A system for transmitting encrypted data over a network, the system comprising:
    a plurality of nodes in a network having secure communication and configured to transmit encrypted data from a source to a final destination, wherein the encrypted data is transmitted in a packet that includes a previous hop in the network and a subsequent hop in the network, wherein the packet excludes the final destination, wherein:
       a first node in the plurality of nodes comprising an ingress gateway and an egress gateway, wherein the first node further comprises a processor and memory configured to store instructions that, when executed by the processor, cause the ingress gateway of the first node to:
          receive the encrypted data from the source through a first secure connection, wherein the encrypted data is wrapped, by the source, using the first secure connection, wherein the wrapping causes an additional layer of encryption for the encrypted data;

unwrap the wrapped and encrypted data;
determine whether one more routing parameters are met based on the unwrapped data, wherein the unwrapped data comprises the encrypted data;
in response to determining that the one or more routing parameters are met, identify a corresponding second secure communication;
rewrap the unwrapped data using the corresponding second secure connection; and
transmit the rewrapped data to the egress gateway of the first node through the corresponding second secure connection, wherein the egress gateway is further configured to transmit the rewrapped data to a subsequent hop in the network using another secure connection.

16. The system of claim 15, wherein the egress gateway is configured to:
receive the rewrapped data from the ingress gateway of the first node through the corresponding second source connection,
unwrap the rewrapped data,
determine whether the one or more routing parameters are met based on the unwrapped data,
in response to determining that the one or more routing parameters are met, identify a corresponding third secure connection,
rewrap the unwrapped data via the corresponding third secure connection, and
transmit the rewrapped data to an ingress gateway of the subsequent hop using the corresponding third secure connection.

17. The system of claim 15, wherein the source is configured to identify a secure encrypted session and encrypt the data using a private key that is shared with only the final destination, wherein, in response to encrypting the data at the source, the source is configured to transmit the encrypted data using the first secure connection to the first node.

18. The system of claim 15, wherein the first node comprises a honeypot server configured to generate decoy traffic and return the decoy traffic into the network to obfuscate the wrapped and encrypted data that is transmitted through the network from the source to the final destination.

19. The system of claim 18, wherein the honeypot server is further configured to listen for potential breaches of the first node and, in response to detecting a potential breach, performing an automated action.

20. The system of claim 19, wherein the automated action comprises transmitting an alert identifying the potential breach to the source or responding to the potential breach.

21. The system of claim 15, wherein the first node is part of an untrusted local jurisdiction.

22. The system of claim 15, wherein the subsequent hop in the network comprises a second node in the plurality of nodes.

23. The system of claim 22, wherein the second node is part of an untrusted neutral jurisdiction.

24. The system of claim 15, wherein the wrapped and encrypted data received over the first secure connection identifies the first node as a destination, and wherein rewrapping the unwrapped data using the corresponding second secure connection comprises re-designating the destination as the subsequent hop in the network.

25. A method for transmitting encrypted data over a network, the method comprising:
receiving, by an ingress gateway of a first node in a plurality of nodes, encrypted data from a source through a first secure connection, wherein the encrypted data is wrapped, by the source, using the first secure connection, wherein the wrapping causes an additional layer of encryption for the encrypted data;
unwrapping, by the ingress gateway of the first node in the plurality of nodes, the wrapped and encrypted data;
determining, by the ingress gateway of the first node in the plurality of nodes, whether one more routing parameters are met based on the unwrapped data, wherein the unwrapped data comprises the encrypted data;
in response to determining that the one or more routing parameters are met, identifying, by the ingress gateway of the first node in the plurality of nodes, a corresponding second secure connection;
rewrapping, by the ingress gateway of the first node in the plurality of nodes, the unwrapped data using the corresponding second secure connection, wherein the rewrapped data comprises the encrypted data; and
transmitting, by the ingress gateway of the first node in the plurality of nodes, the rewrapped data to an egress gateway of the first node in the plurality of nodes, wherein the egress gateway of the first node is further configured to transmit the rewrapped data to a subsequent hop in the plurality of nodes of the network using another secure connection.

26. The method of claim 25, wherein the first secure connection is different than the corresponding second secure connection.

27. The method of claim 26, wherein the first secure connection is different than and separate from the corresponding second secure connection, and wherein the first secure connection and the corresponding second secure connection are associated with the source.

28. The method of claim 27, wherein the first secure connection and the corresponding second secure connection are associated with an IP address of the source.

29. The method of claim 25, wherein identifying the corresponding second secure connection comprises checking a correspondence table to determine whether the first secure connection is associated with another secure connection, wherein the another secure connection includes the corresponding second secure connection.

30. The method of claim 25, further comprising generating and returning, by a honeypot server of the first node, decoy traffic into the network to obfuscate the wrapped and encrypted data that is transmitted through the network from the source to a final destination.

* * * * *